US012115548B2

(12) United States Patent
Ikushima

(10) Patent No.: US 12,115,548 B2
(45) Date of Patent: Oct. 15, 2024

(54) ATOMIZATION NOZZLE, ATOMIZATION DEVICE, SPRAYING DEVICE, AND ATOMIZATION METHOD

(71) Applicant: MUSASHI ENGINEERING, INC., Mitaka (JP)

(72) Inventor: Kazumasa Ikushima, Mitaka (JP)

(73) Assignee: MUSASHI ENGINEERING, INC., Mitaka (JP)

( * ) Notice: Subject to any disclaimer, the term of this patent is extended or adjusted under 35 U.S.C. 154(b) by 0 days.

(21) Appl. No.: 18/683,924

(22) PCT Filed: Mar. 27, 2023

(86) PCT No.: PCT/JP2023/012096

§ 371 (c)(1),
(2) Date: Feb. 15, 2024

(87) PCT Pub. No.: WO2023/190284

PCT Pub. Date: Oct. 5, 2023

(65) Prior Publication Data

US 2024/0261808 A1 Aug. 8, 2024

(30) Foreign Application Priority Data

Mar. 31, 2022 (JP) ................................ 2022-057932

(51) Int. Cl.
*B05B 7/10* (2006.01)
*B05B 1/02* (2006.01)
(Continued)

(52) U.S. Cl.
CPC .................. *B05B 7/10* (2013.01); *B05B 1/12* (2013.01); *B05B 1/3405* (2013.01); *B05B 7/066* (2013.01);
(Continued)

(58) Field of Classification Search
CPC ......... B05B 1/12; B05B 1/3405; B05B 7/066; B05B 7/10; B05B 7/2489; B05B 7/2494;
(Continued)

(56) References Cited

U.S. PATENT DOCUMENTS 2,378,348 A * 6/1945 Wilmes ................. B05B 1/3436 239/491
5,868,321 A * 2/1999 Haruch ................. B05B 7/0466 239/432

(Continued)

FOREIGN PATENT DOCUMENTS

JP 2006-35081 A 2/2006
JP 2007-319771 A 12/2007

(Continued)

OTHER PUBLICATIONS

International Search Report dated May 23, 2023, issued in counterpart International Application No. PCT/JP2023/012096, with English Translation. (4 pages).

(Continued)

*Primary Examiner* — Darren W Gorman
(74) *Attorney, Agent, or Firm* — WHDA, LLP

(57) ABSTRACT

Provided is an atomization nozzle including: a nozzle body member having a gas ejection path and a gas ejection port; a liquid nozzle member having a liquid ejection path and a liquid ejection port, a tip portion of the liquid nozzle member being inserted through the gas ejection path; a pattern adjustment groove that produces a swirling flow in the gas ejection path; and a spraying pattern adjustment member having a communication flow path and a blocking portion, where a spraying pattern can be changed by switching between a first position in which the pattern adjustment groove and a gas supply flow path are in communication via the communication flow path and a second position in which the pattern adjustment groove is covered by the blocking (Continued)

portion. Also provided are an atomization device, a spraying device, and a spraying method.

20 Claims, 17 Drawing Sheets

(51) Int. Cl.

| | |
|---|---|
| ***B05B 1/12*** | (2006.01) |
| ***B05B 1/34*** | (2006.01) |
| ***B05B 7/06*** | (2006.01) |
| ***B05B 7/24*** | (2006.01) |

(52) U.S. Cl.
CPC ............... *B05B 1/02* (2013.01); *B05B 7/2489* (2013.01); *B05B 7/2494* (2013.01)

(58) Field of Classification Search
CPC .. B05B 1/02; B05B 1/34; B05B 1/341; B05B 1/3415; B05B 1/3421; B05B 1/3431; B05B 1/3436; B05B 1/3452; B05B 1/3468; B05B 1/3489; B05B 7/06; B05B 7/062
See application file for complete search history.

(56) References Cited

U.S. PATENT DOCUMENTS 6,270,019 B1 * 8/2001 Reighard .................. B05C 5/02 239/290
2003/0136861 A1 * 7/2003 Kangas ..................... B05B 7/10 239/422
2007/0262173 A1 * 11/2007 Percival ................ B05B 7/0815 239/428
2008/0237372 A1 * 10/2008 Scheer .................... B05B 7/066 239/425

FOREIGN PATENT DOCUMENTS

| | | | |
|---|---|---|---|
| JP | 4217799 | B2 | 2/2009 |
| JP | 2010-149048 | A | 7/2010 |
| JP | 2012-239964 | A | 12/2012 |
| JP | 2014-200737 | A | 10/2014 |
| JP | 2017-213517 | A | 12/2017 |
| KR | 101531705 | B1 | 6/2015 |
| KR | 102234900 | B1 | 4/2021 |

OTHER PUBLICATIONS

Written Opinion of the International Searching Authority (Form PCT/ISA/237) dated May 23, 2023, issued in counterpart International Application No. PCT/JP2023/012096. (2 pages).
Office Action dated May 27, 2024, issued in counterpart KR application No. 10-2023-7045226, with English translation. (16 pages).

* cited by examiner

[Fig.1]
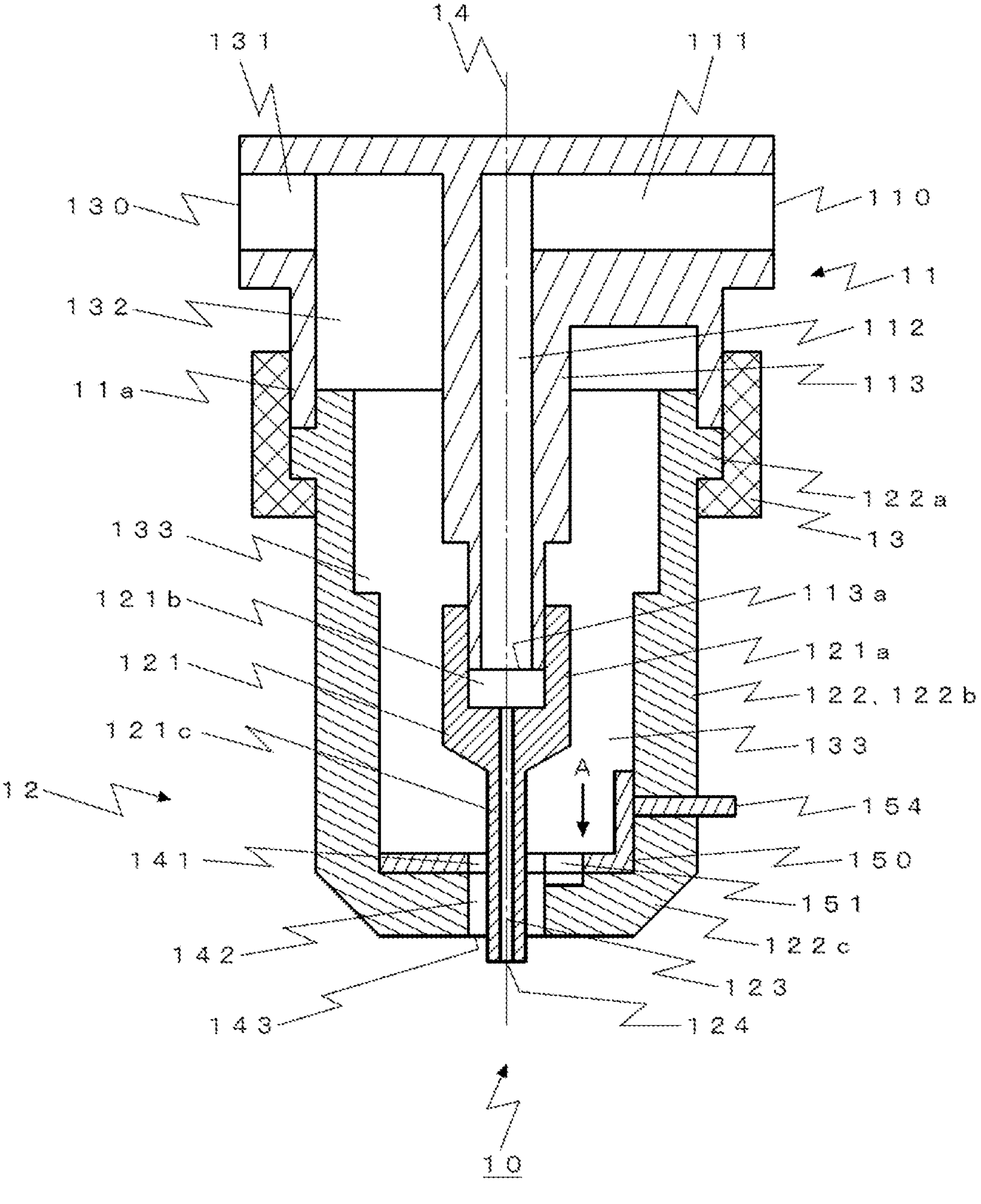

[Fig.2]
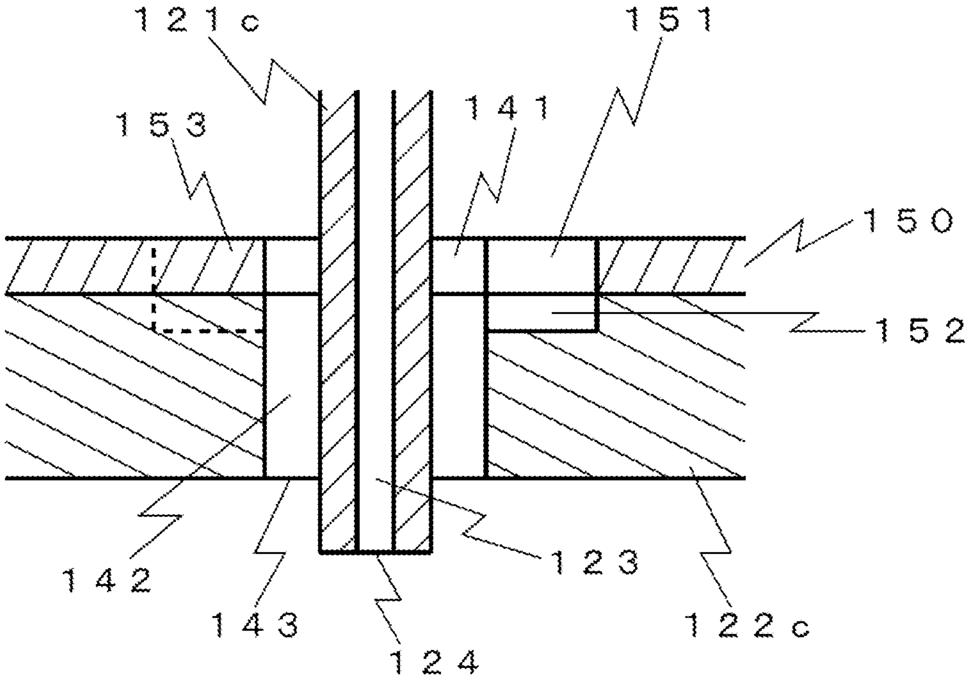

[Fig.3]
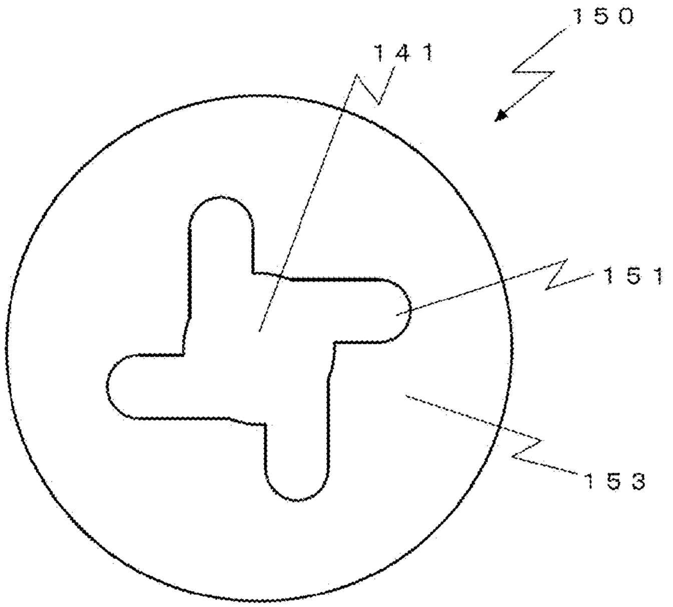
(a)
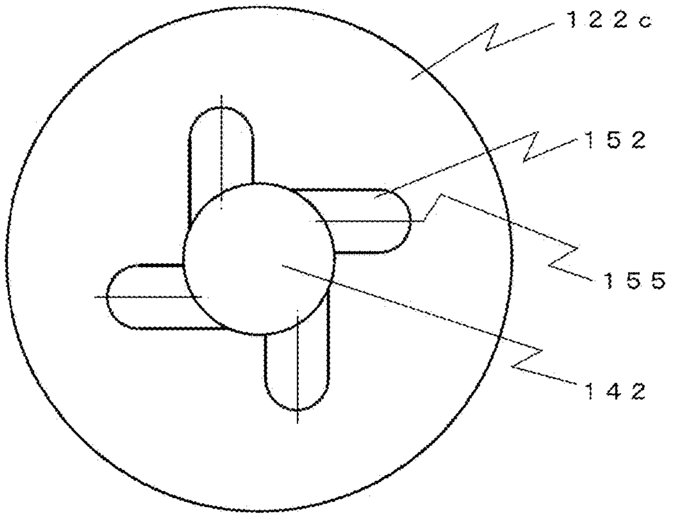
(b)

[Fig.4]
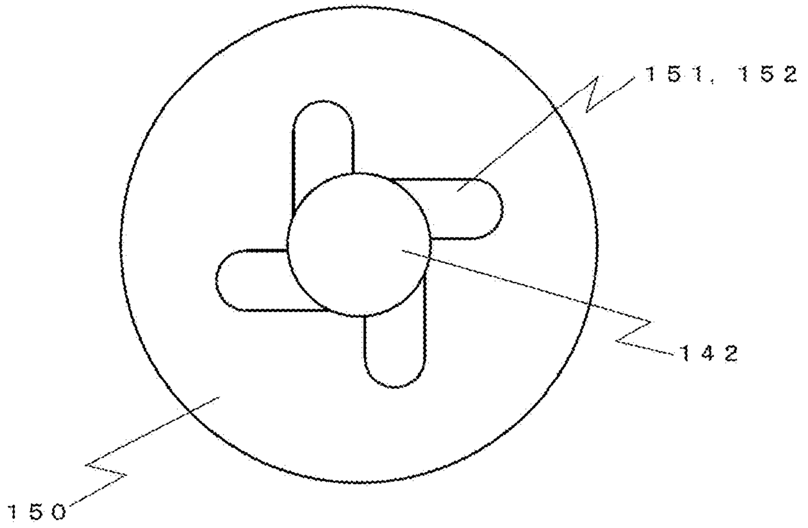
(a)
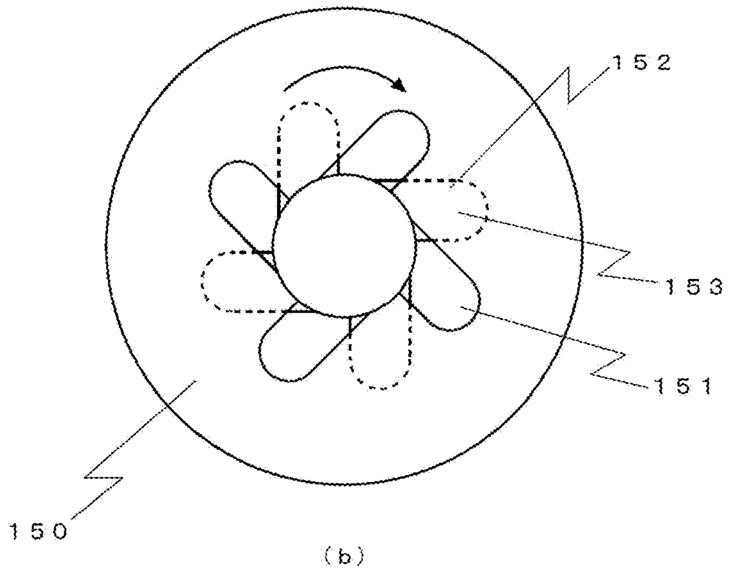
(b)

[Fig.5]
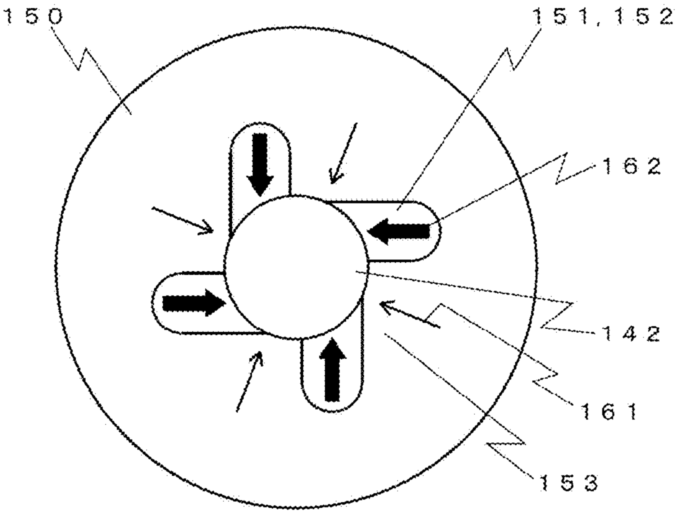
(a)
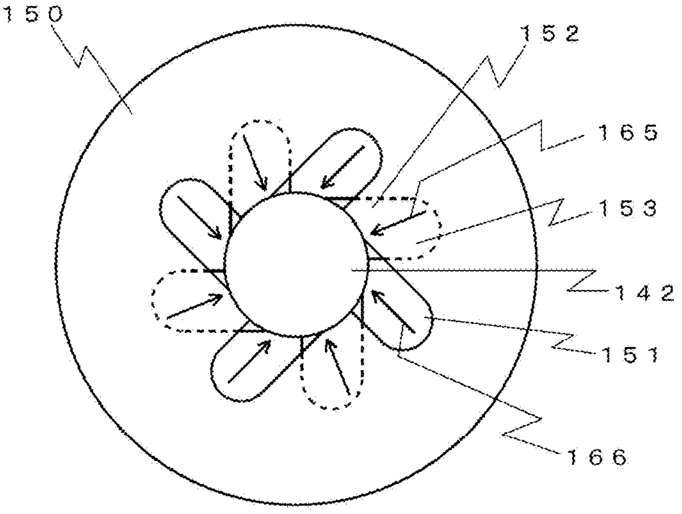
(b)

[Fig.6]
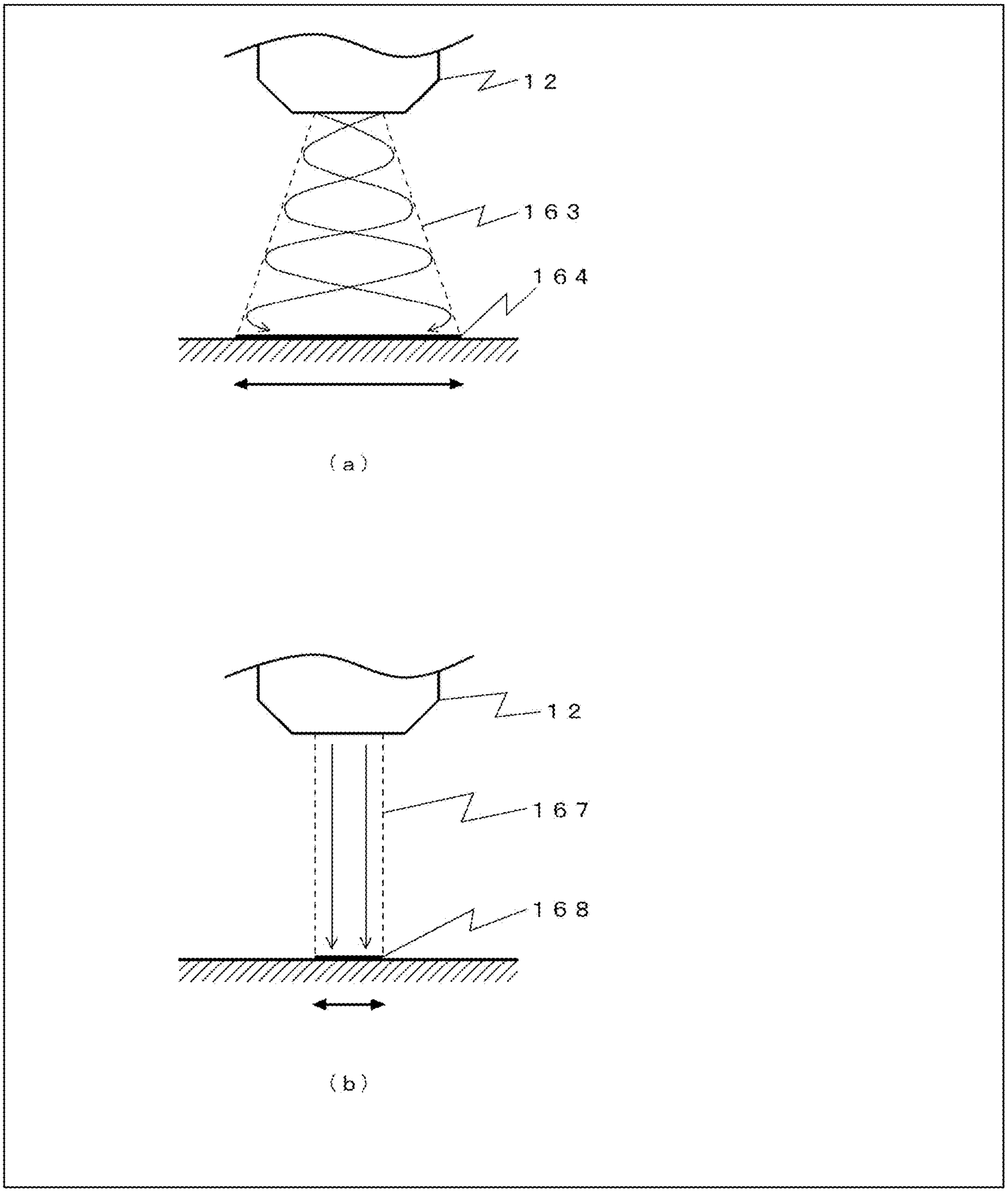

[Fig.7]
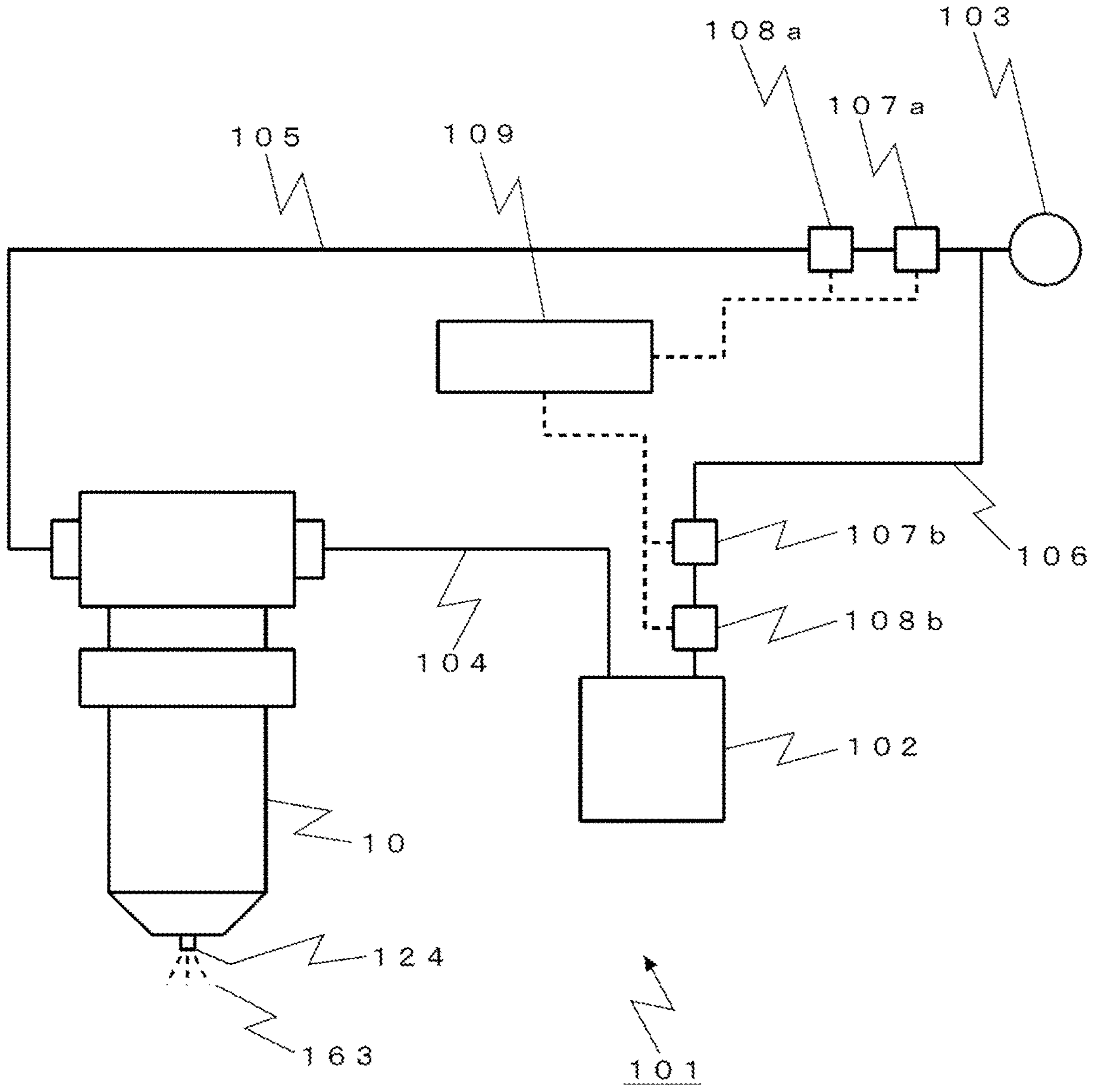

[Fig.8]
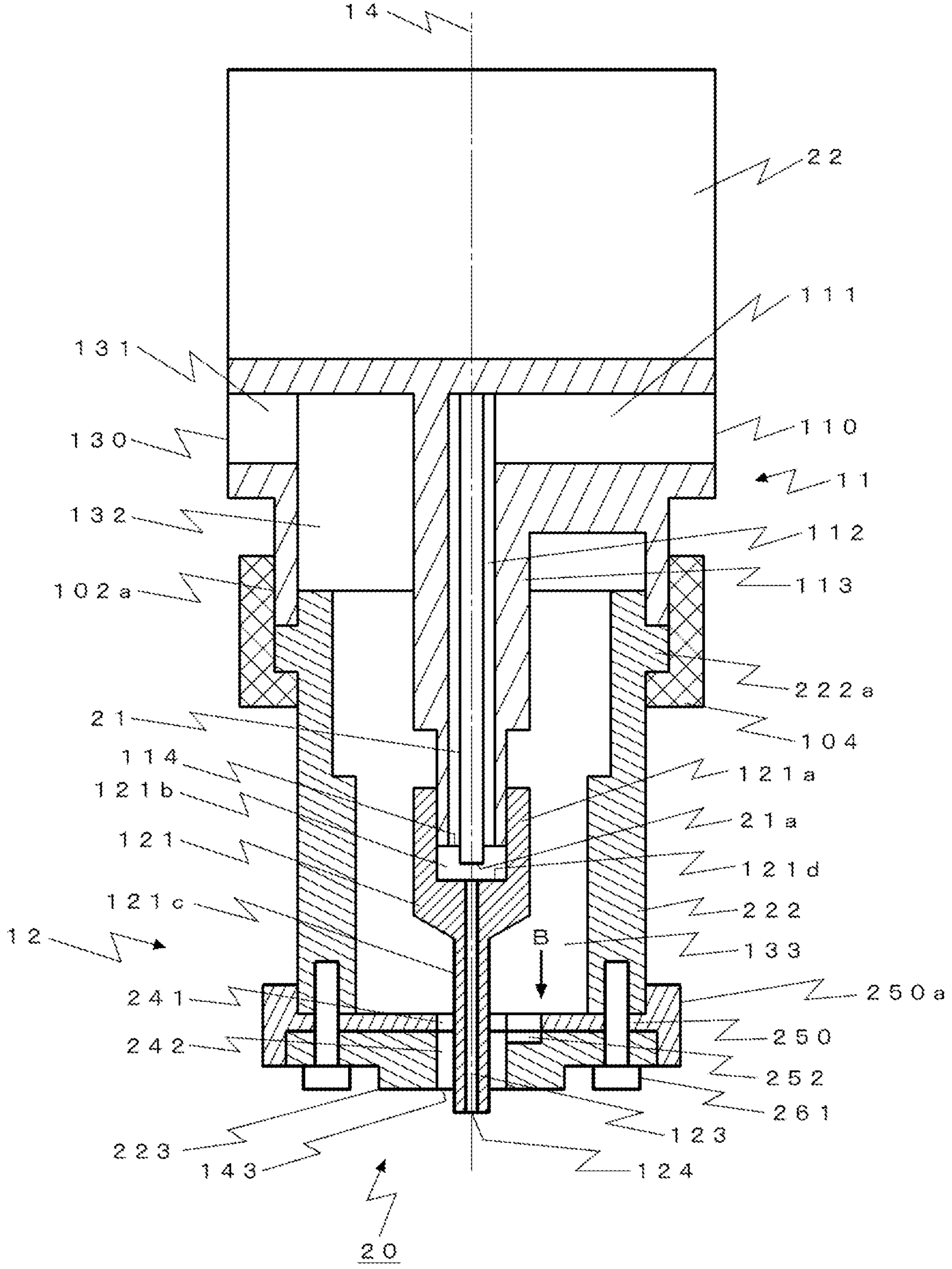

[Fig.9]
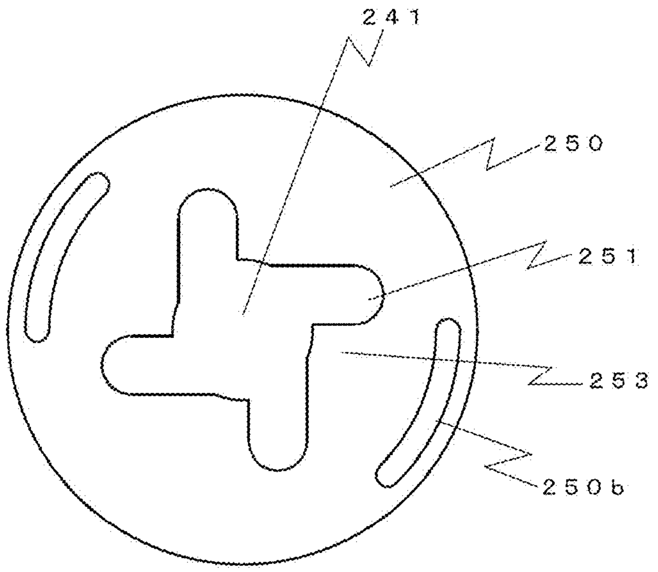
(a)
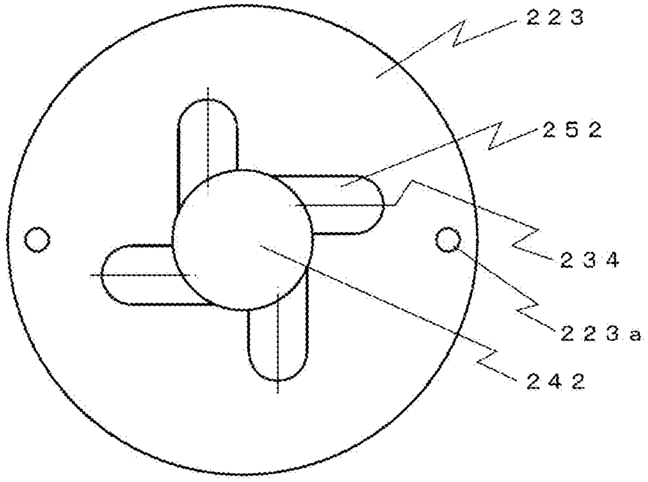
(b)

[Fig.10]
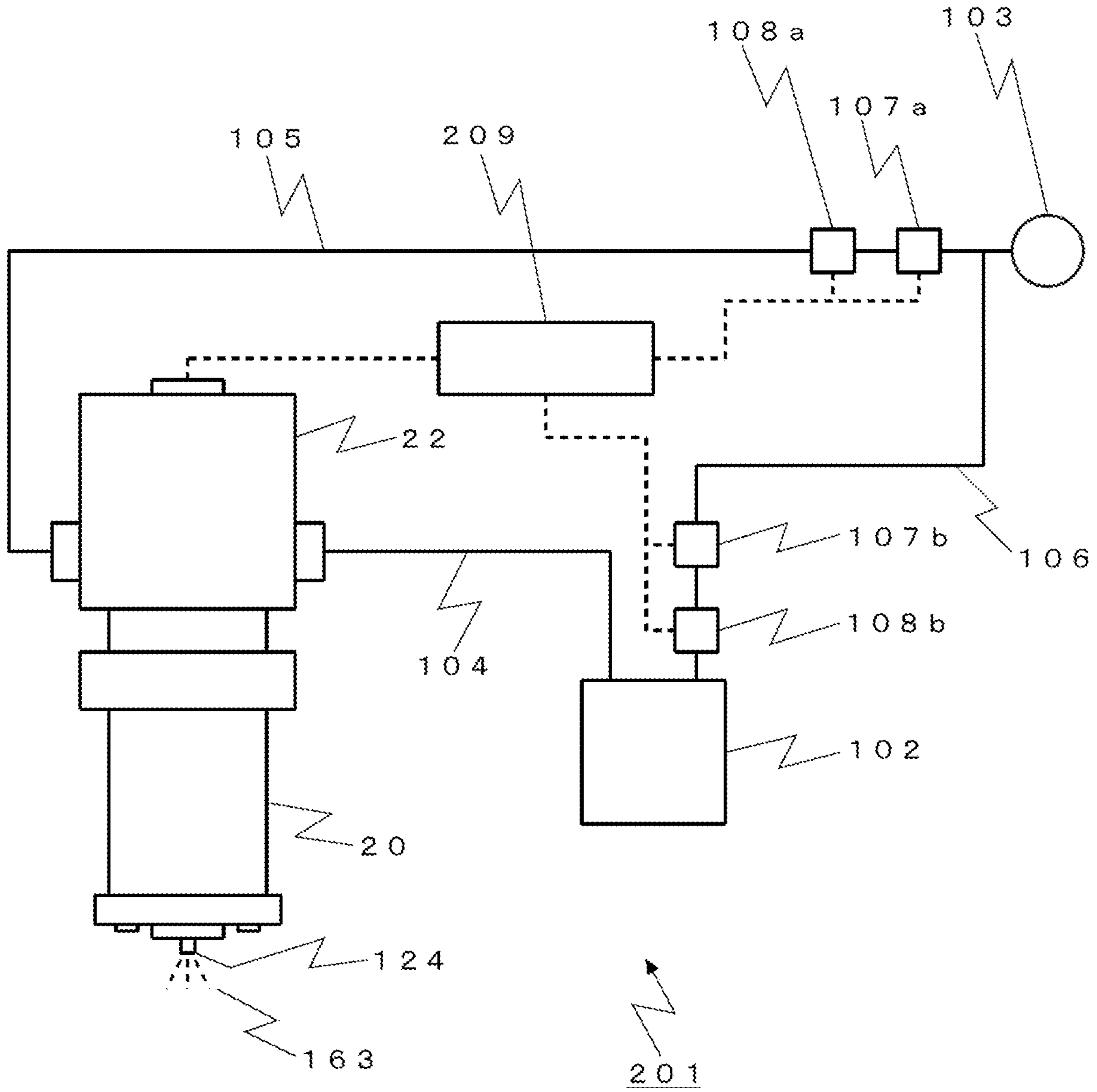

[Fig.11]
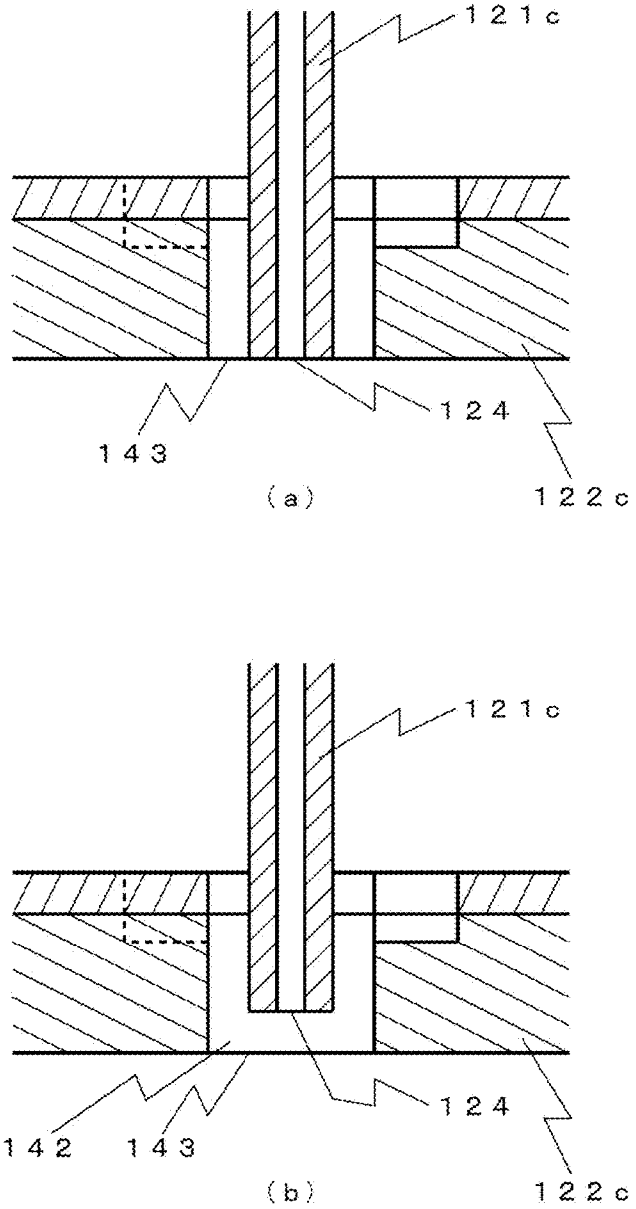

[Fig.12]
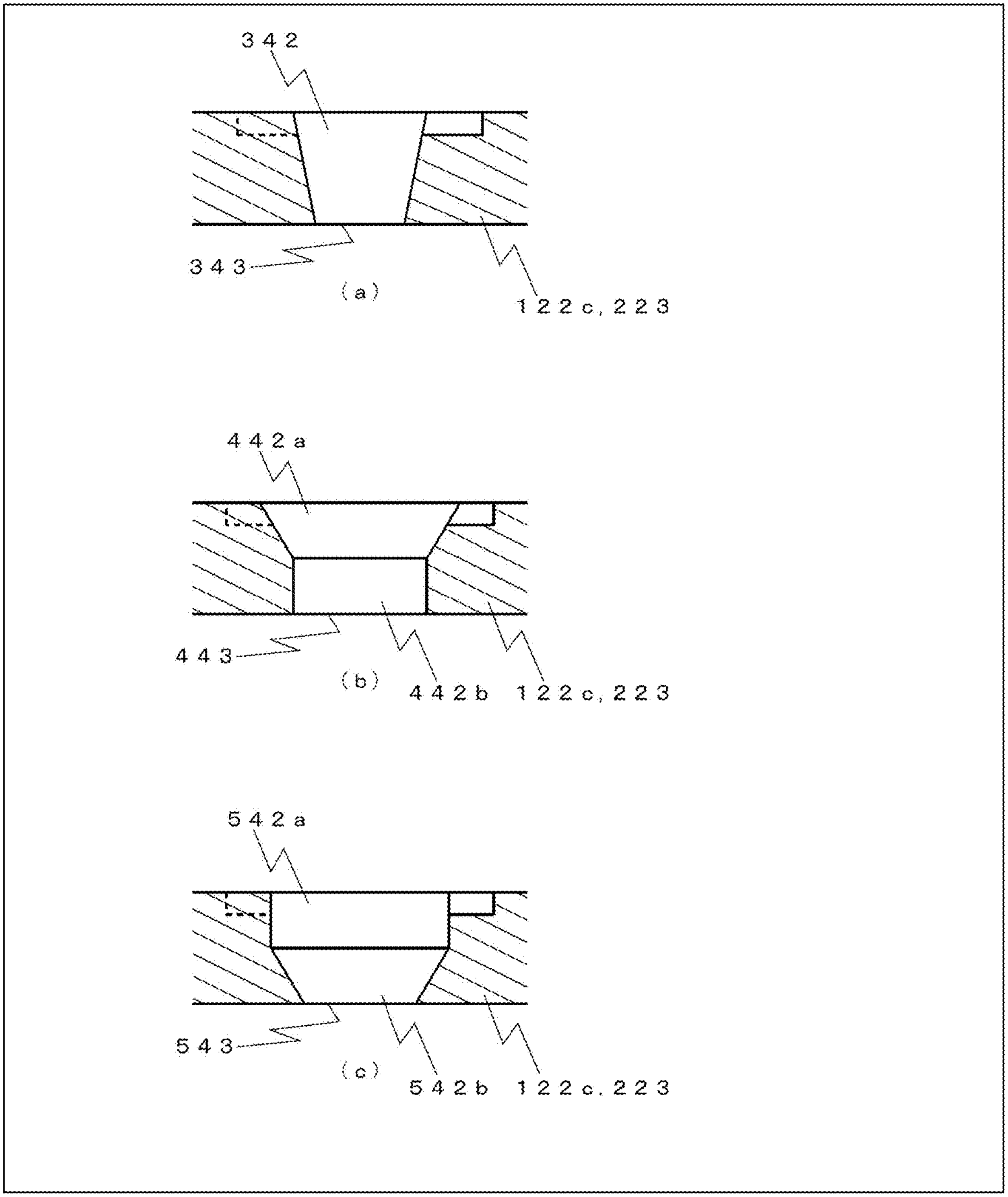

[Fig.13]
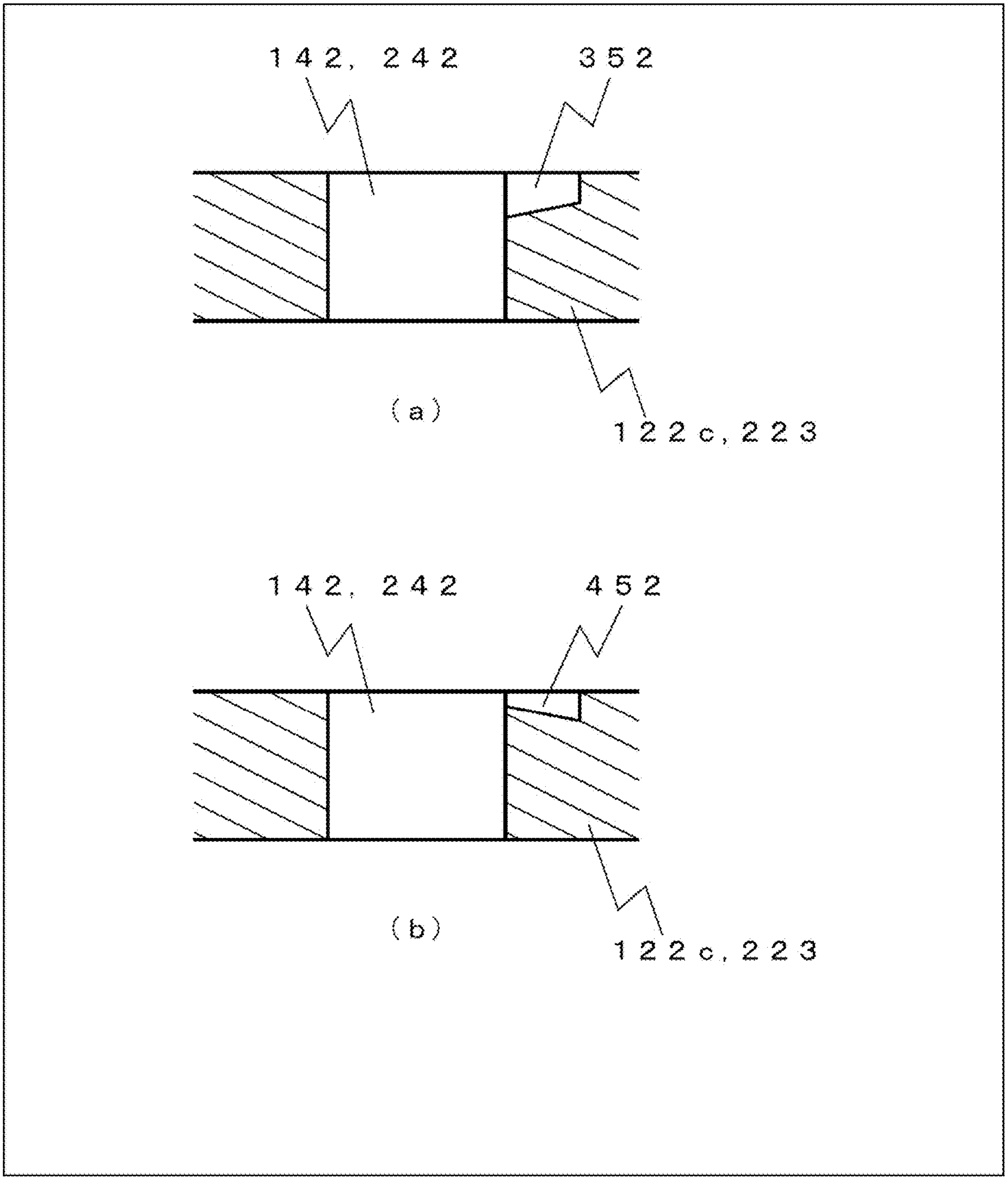

[Fig.14]
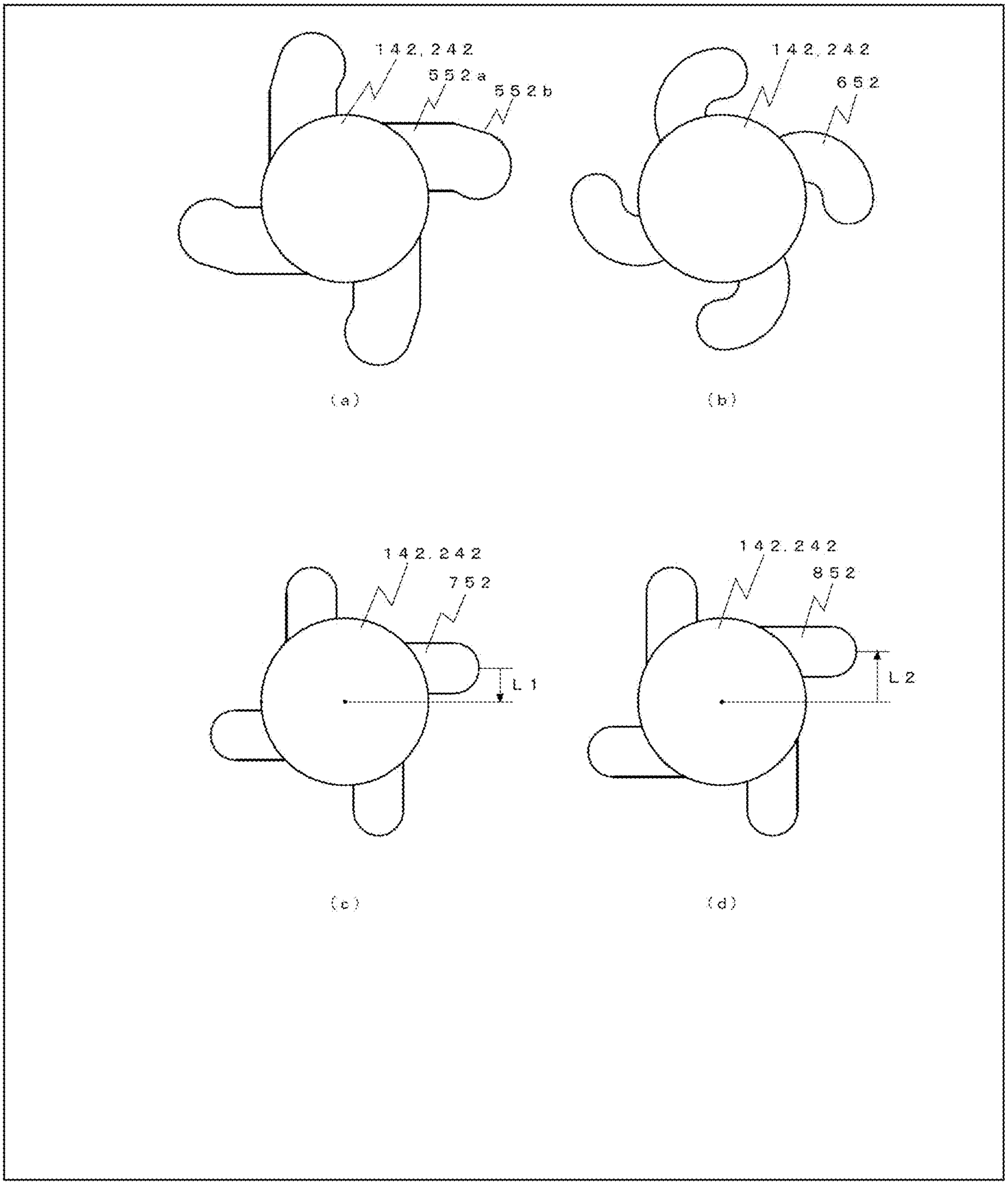

[Fig. 15]
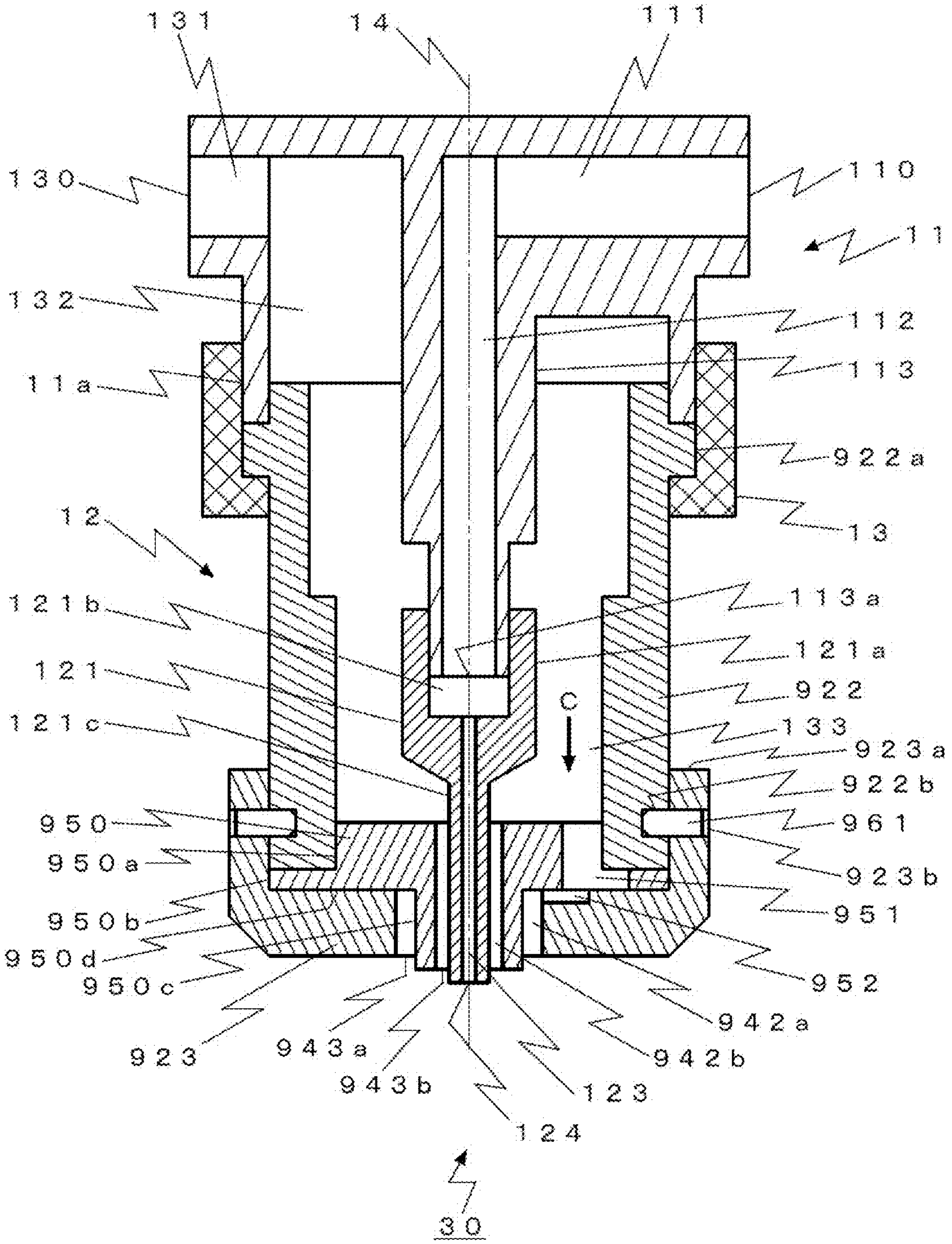

[Fig.16]
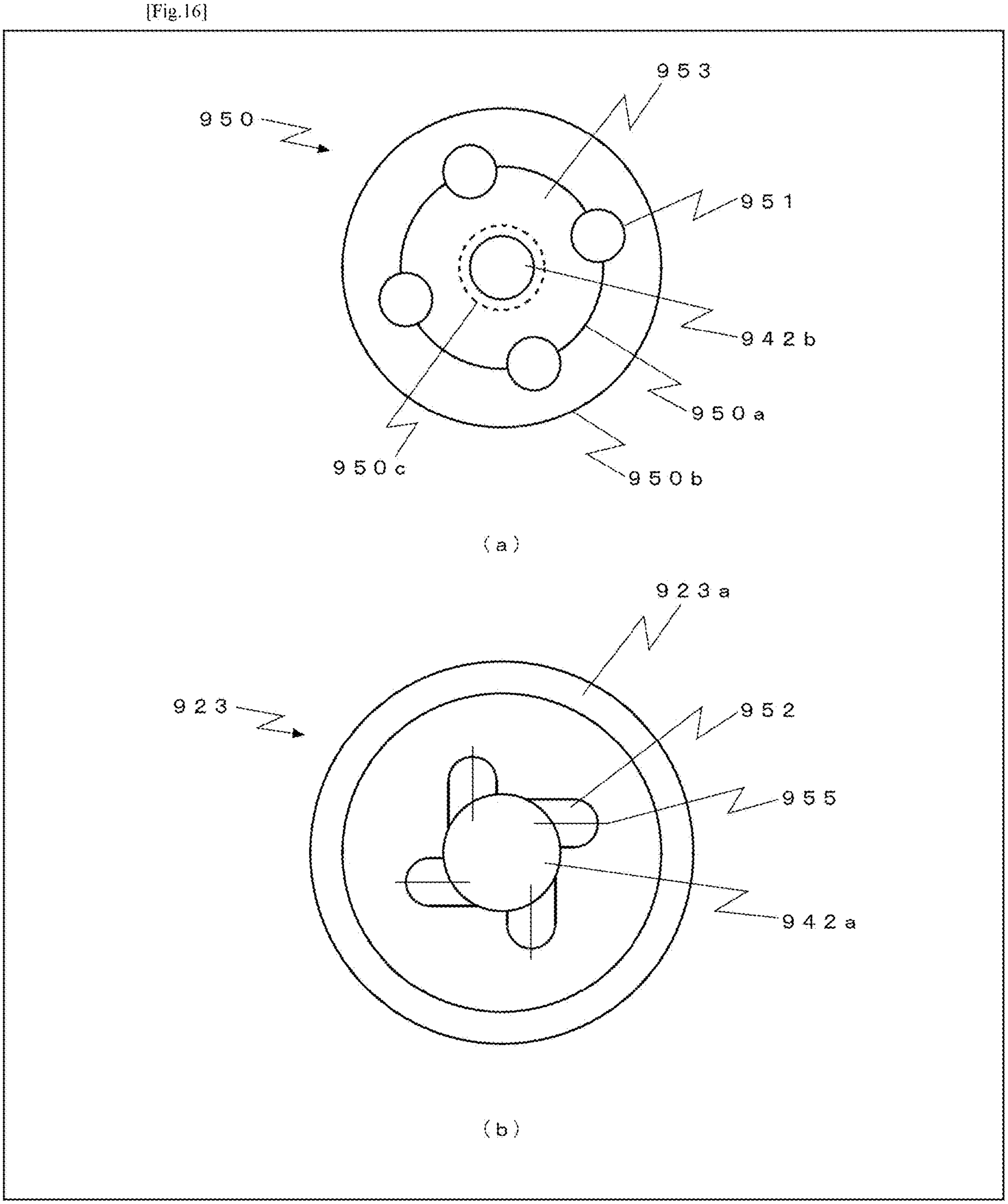

[Fig.17]
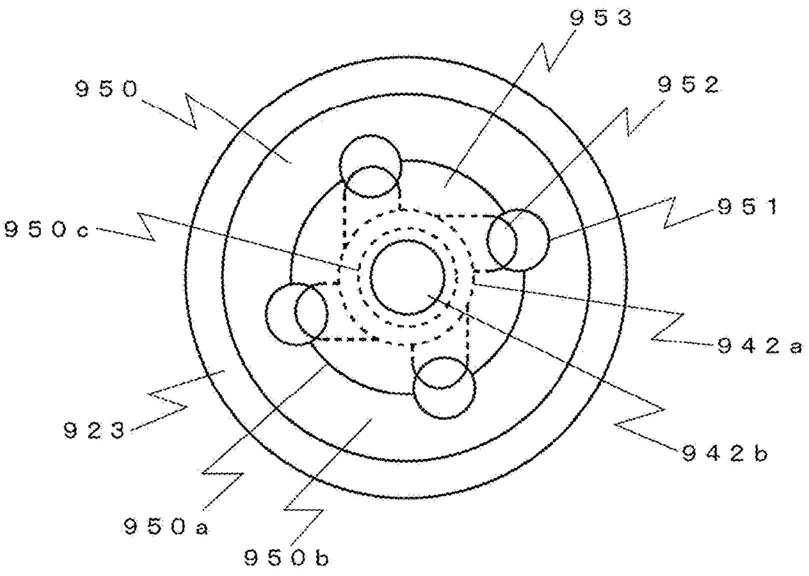
(a)
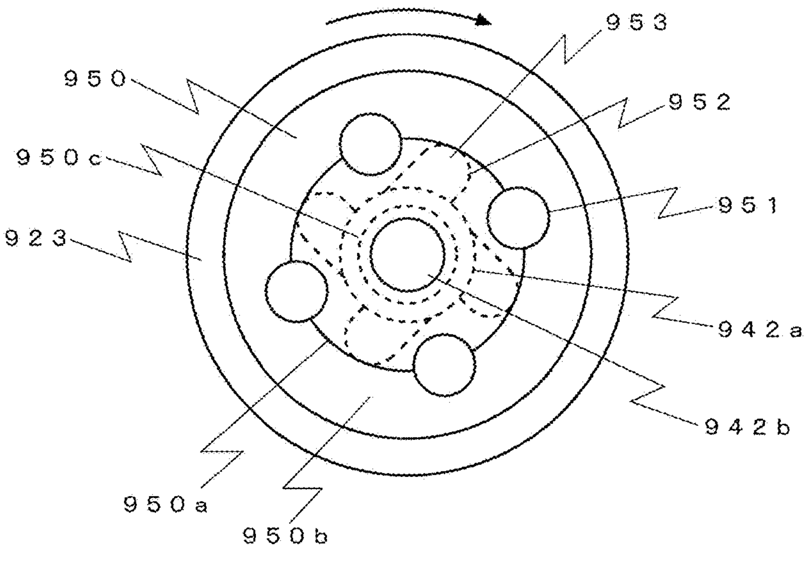
(b)

ATOMIZATION NOZZLE, ATOMIZATION DEVICE, SPRAYING DEVICE, AND ATOMIZATION METHOD

TECHNICAL FIELD

The present invention relates to an atomization nozzle, an atomization device, a spraying device, and a spraying method.

BACKGROUND ART

As a type of atomization devices, air sprays are known that mix liquid and gas to atomize the liquid into mist and spray it onto a target object. The shape and size of liquid that has been sprayed onto a target object (hereinafter, sometimes referred to as a spraying pattern) depends on the shape of a liquid or gas ejection port. To change the spraying pattern, in general, parts constituting the liquid or gas ejection port are replaced.

Meanwhile, as an alternative means, there is also a technology as in Patent Document 1. Patent Document 1 discloses an air spray nozzle including, outside a coating material discharge port that discharges coating material in a circular pattern, a first air ejection portion that ejects air in a straight line along a coating material discharge direction, and a second air ejection portion that ejects air as a swirling flow in the coating material discharge direction, in which a size of a coating material pattern can be changed by controlling an air ejection amount from the first air ejection portion and an air ejection amount from the second air ejection portion.

PRIOR ART LIST

Patent Document

Patent Document 1: Japanese Patent Laid-Open Publication No. 2010-149048

SUMMARY OF THE INVENTION

Problems to be Solved by the Invention

General atomization devices require replacement of parts of an ejection port to change the spraying pattern. In Patent Document 1, providing two gas flow paths, which are the first air ejection portion and the second air ejection portion, allows for changing the spraying pattern without replacing parts. However, a supply pipe is connected to each of the two gas flow paths, causing an issue that the structure of the nozzle itself is complex and more devices or the like should be connected thereto.

Therefore, an object of the present invention is to provide an atomization nozzle, an atomization device, a spraying device, and a spraying method that allow for changing the spraying pattern with a simple equipment configuration.

Means for Solving the Problems

An atomization nozzle according to the present invention is an atomization nozzle that sprays, by gas supplied from a gas supply flow path, liquid supplied from a liquid supply flow path, the atomization nozzle including: a nozzle body member having a gas ejection path and a gas ejection port for ejecting the gas supplied from the gas supply flow path; a liquid nozzle member having a liquid ejection path and a liquid ejection port for ejecting the liquid supplied from the liquid supply flow path, a tip portion of the liquid nozzle member being inserted through the gas ejection path; a pattern adjustment groove that extends outward from the gas ejection path and produces a swirling flow in the gas ejection path; and a spraying pattern adjustment member having a communication flow path via which the pattern adjustment groove and the gas supply flow path are in communication, and a blocking portion that covers the pattern adjustment groove, wherein a spraying pattern can be changed by switching between a first position in which the pattern adjustment groove and the gas supply flow path are in communication via the communication flow path and a second position in which the pattern adjustment groove is covered by the blocking portion.

The atomization nozzle may have a plurality of the pattern adjustment grooves and a plurality of the communication flow paths.

In the atomization nozzle, the pattern adjustment grooves may include three or more pattern adjustment grooves that are evenly arranged with respect to each other.

In the atomization nozzle, the nozzle body member may include a trunk portion having an internal space serving as a gas flow path via which the gas supply flow path and the gas ejection path are in communication, and a bottom portion in which the gas ejection path and the pattern adjustment groove are formed.

In the atomization nozzle, the spraying pattern adjustment member may include a switching operation member for switching between the first position and the second position.

In the atomization nozzle, the nozzle body member may include the bottom portion having an inner bottom surface in which the pattern adjustment groove is formed, and the spraying pattern adjustment member may be arranged on the inner bottom surface of the bottom portion of the nozzle body member.

In the atomization nozzle, the nozzle body member may include an upper nozzle body member and a lower nozzle body member, wherein the upper nozzle body member includes an internal space serving as a gas flow path via which the gas supply flow path and the gas ejection path are in communication and has a lower end portion with an opening, and the pattern adjustment groove is formed in the lower nozzle body member, and the atomization nozzle may further include a supporting member that supports the spraying pattern adjustment member between the lower end portion of the upper nozzle body member and the lower nozzle body member.

In the atomization nozzle, switching between the first position and the second position may be performed by rotating the spraying pattern adjustment member.

In the atomization nozzle, the lower nozzle body member may include a first lower nozzle body member formed with the pattern adjustment groove having a first opening shape and a second lower nozzle body member formed with the pattern adjustment groove having a second opening shape, and one out of the first lower nozzle body member and the second lower nozzle body member can be selected to support the spraying pattern adjustment member with the supporting member.

In the atomization nozzle, the gas ejection path may include a first gas ejection path that is provided in the lower nozzle body member and communicates with the pattern adjustment groove, and a second gas ejection path that is provided in the spraying pattern adjustment member, the liquid nozzle member being inserted through the second gas ejection path, and switching between the first position and the second position may be performed by rotating the lower nozzle body member.

In the atomization nozzle, an opening shape of the pattern adjustment groove and an opening shape of the communication flow path may be the same.

In the atomization nozzle, the pattern adjustment groove may be provided at a position offset from a straight line that passes through a center of the gas ejection path and extends in a horizontal direction.

In the atomization nozzle, overlap between the communication flow path and the pattern adjustment groove may be adjustable stepwise by setting a position stepwise from the first position to the second position.

The atomization nozzle may include a position adjustment driving device that automatically performs switching between the first position and the second position.

An atomization device according to the present invention includes: the atomization nozzle; and an acceptance member that has the liquid supply flow path and the gas supply flow path and is coupled to the atomization nozzle.

The atomization device may include an on-off valve for putting the liquid supply flow path and the liquid ejection path in communication and isolation.

In the atomization device, the on-off valve may include a rod that opens and closes a flow path entrance in the liquid nozzle member and a rod driving device that moves the rod forward and backward.

A spraying device according to the present invention includes: the atomization device; a gas supply source that supplies the atomization device with gas; a liquid supply source that supplies the atomization device with liquid to be sprayed; a pressure regulating device that regulates pressure of the gas supplied by the gas supply source to send the gas to the atomization device; a liquid feeding device that applies pressure to the liquid supplied by the liquid supply source to send the liquid to the atomization device; and a control device that controls operation of the pressure regulating device and the liquid feeding device.

In the spraying device, the liquid feeding device may include: (A) a pressure regulator and an on-off valve that are provided in a pipe via which the gas supply source and the liquid supply source are in communication; or (B) a pump that is provided in a pipe via which the atomization device and the liquid supply source are in communication.

A spraying method according to the present invention is a spraying method using the spraying device, including the steps of: performing application in a state where the pattern adjustment groove and the gas supply flow path are in communication; and performing application in a state where the pattern adjustment groove is covered by the blocking portion.

Advantageous Effect of the Invention

According to the present invention, it is possible to provide an atomization nozzle, an atomization device, a spraying device, and a spraying method that allow for changing the spraying pattern with a simple equipment configuration.

BRIEF DESCRIPTION OF THE DRAWINGS

FIG. 1 is a sectional view of an atomization device according to a first embodiment.

FIG. 2 is a partial sectional view of a nozzle lower end portion of the atomization device according to the first embodiment.

FIG. 3 (*a*) is a partial plan view (A-arrow view) of a spraying pattern adjustment member according to the first embodiment, and (b) is a partial plan view (A-arrow view) illustrating an inner bottom surface of a bottom portion of a nozzle body member.

FIG. 4 shows explanatory views of spraying pattern adjustment operation by the spraying pattern adjustment member according to the first embodiment. Here, (a) illustrates a state where communication grooves and pattern adjustment grooves overlap, and (b) illustrates a state where a blocking portion and the pattern adjustment grooves overlap.

FIG. 5 shows explanatory views of actions of the communication grooves with arrows added to FIG. 4. Here, (a) illustrates a state where the communication grooves and the pattern adjustment grooves overlap, and (b) illustrates a state where the blocking portion and the pattern adjustment grooves overlap.

FIG. 6 (*a*) illustrates a spraying pattern when the spraying pattern adjustment member is at a first position, and (b) illustrates a spraying pattern when the spraying pattern adjustment member is at a second position.

FIG. 7 is a block diagram of a spraying device according to the first embodiment.

FIG. 8 is a sectional view of an atomization device according to a second embodiment.

FIG. 9 (*a*) is a plan view (B-arrow view) of a bottom portion of a spraying pattern adjustment member according to the second embodiment, and (b) is a plan view (B-arrow view) of a lower nozzle body member.

FIG. 10 is a block diagram of a spraying device according to the second embodiment.

FIG. 11 shows partial sectional views of the nozzle lower end portion of the atomization device in which the position of the lower end of a liquid ejection portion of a liquid nozzle member is adjustable. Here, (a) illustrates a case where the liquid ejection portion of the liquid nozzle member is at a first retracted position, and (b) illustrates a case where the liquid ejection portion of the liquid nozzle member is at a second retracted position.

FIG. 12 shows partial sectional views of the nozzle lower end portion of the atomization device for explaining variations of a gas ejection path. Here, (a) illustrates a case where the gas ejection path has a narrowing part over the entire length, (b) illustrates a case where the gas ejection path has a narrowing part on the upper side, and (c) illustrates a case where the gas ejection path has a narrowing part on the lower side.

FIG. 13 shows partial sectional views of the nozzle lower end portion of the atomization device for explaining variations of the pattern adjustment groove. Here, (a) illustrates a case where the pattern adjustment groove has a bottom surface that is a slope descending toward the gas ejection path, and (b) illustrates a case where the pattern adjustment groove has a bottom surface that is a slope rising toward the gas ejection path.

FIG. 14 shows plan views for explaining other variations of the pattern adjustment groove. Here, (a) illustrates a case where a bent portion is provided at an end portion, (b) illustrates a case where the entire pattern adjustment groove is curved, (c) illustrates a case where a connection position is closer to a center, and (d) illustrates a case where the connection position is closer to an outer periphery.

FIG. 15 is a sectional view of an atomization device according to a third embodiment.

FIG. 16 (*a*) is a plan view (C-arrow view) of a spraying pattern adjustment member according to the third embodiment, and (b) is a plan view (C-arrow view) of a lower nozzle body member.

FIG. 17 is an explanatory view (C-arrow view) of spraying pattern adjustment operation by the spraying pattern adjustment member according to the third embodiment. Here, (a) illustrates a state where through-holes and pattern adjustment grooves overlap, and (b) illustrates a state where a blocking portion and the pattern adjustment grooves overlap.

MODE FOR CARRYING OUT THE INVENTION

Embodiments of the present invention will be described below.

First Embodiment (Atomization Device 10)

As illustrated in FIG. 1, an atomization device 10 according to a first embodiment mainly consists of an acceptance member 11 and an atomization nozzle 12. The atomization device 10 includes one liquid supply flow path (110 to 112) and one gas supply flow path (130 to 132).

The acceptance member 11 includes a liquid supply port 110, a first liquid flow path 111 communicating with the liquid supply port 110, and a second liquid flow path 112 communicating with the first liquid flow path 111, which are constituents of the liquid supply flow path.

The second liquid flow path 112 is a vertically extending columnar space formed inside a liquid flow path member 113. The liquid flow path member 113 is a hollow columnar member formed along a central axis 14 of the acceptance member 11. A lower end portion of the liquid flow path member 113 provided with the second liquid flow path 112 is fitted into a connecting portion 121*a* of a liquid nozzle member. Liquid that has passed through the second liquid flow path 112 is discharged from an opening 113*a* provided at the lower end of the liquid flow path member 113 into a depressed portion 121*b* of the liquid nozzle member.

The acceptance member 11 includes a gas supply port 130, a first gas flow path 131 communicating with the gas supply port 130, and a second gas flow path 132 communicating with the first gas flow path 131, which are constituents of the gas supply flow path. The second gas flow path 132 communicates with a third gas flow path 133 formed in the atomization nozzle 12. An attachment portion 11*a* provided on a lower side of the acceptance member is a cylindrical segment that is concentrically formed to surround the liquid flow path member 113, and a space between the attachment portion 11*a* and the liquid flow path member 113 forms the second gas flow path 132.

Gas supplied to the gas supply port 130 passes through the first to third gas flow paths (131 to 133) and a gas ejection path 142, and is ejected from a gas ejection port 143.

The atomization nozzle 12 is constituted by the liquid nozzle member 121 and a nozzle body member 122 that is formed to surround the liquid nozzle member 121.

The liquid nozzle member 121 includes the connecting portion 121*a* formed with the depressed portion 121*b* opening upward and a needle-like liquid ejection portion 121*c* having a liquid ejection port 124 at its lower end. The connecting portion 121*a* has a columnar shape with a tapered portion on the lower side and is coupled, at the tapered portion, to the liquid ejection portion 121*c* having a columnar shape with a smaller diameter than the connecting portion 121*a*. Inside the liquid nozzle member 121, a liquid ejection path 123 concentric with the central axis 14 is formed. The liquid ejection path 123 is a through-hole provided in the liquid nozzle member 121, an entrance of which is provided in an inner bottom surface of the depressed portion 121*b* and an exit of which is the liquid ejection port 124 provided in the liquid nozzle member 121.

The nozzle body member 122 is a bottomed cylindrical member and, near the upper end, formed with an acceptance member connecting portion 122*a* that is an annular protruded portion protruding radially outward. The nozzle body member 122 of the present embodiment is coupled to the acceptance member 11 with a coupling member 13 in a state where the acceptance member connecting portion 122*a* is in contact with a lower end portion of the attachment portion 11*a* of the acceptance member. The nozzle body member 122 may be coupled directly to the acceptance member 11 by screwing together, fitting, or the like without the coupling member 13. A trunk portion 122*b* of the nozzle body member 122 is hollow, and a space between the trunk portion 122*b* and the liquid nozzle member 121 arranged in the nozzle body member 122 constitutes the third gas flow path 133. The third gas flow path 133 communicates with the outside via the gas ejection port 143 provided in a bottom portion 122*c* of the nozzle body member, a communication hole (central communication hole) 141, and the gas ejection path 142.

As illustrated in FIG. 2, on an inner bottom surface of the bottom portion 122*c* of the nozzle body member, a spraying pattern adjustment member 150 having the communication hole 141 and communication grooves (communication flow paths) 151 is arranged. The inner bottom surface of the bottom portion 122*c* of the nozzle body member is formed with the gas ejection path 142 that communicates with the communication hole 141, and the liquid ejection portion 121*c* of the liquid flow path member is inserted therethrough. The gas ejection path 142 is a flow path with a smaller diameter than the smallest cross-sectional area of the third gas flow path 133, and communicates with the outside via the gas ejection port 143.

The gas ejection path 142 is a columnar hole penetrating the bottom portion 122*c* of the nozzle body member. In the present embodiment, the shape of the gas ejection path 142 is circular in plan view, but it may be oval. The inner diameter of the gas ejection path 142 is larger than the outer diameter of the liquid ejection portion 121*c* of the liquid flow path member, and allows gas to flow around the liquid ejection portion 121*c*. A lower end portion of the gas ejection path 142 constitutes the annular gas ejection port 143 between the lower end portion and an outer periphery of the liquid ejection portion 121*c*. Gas having passed through the gas ejection path 142 is ejected out from the gas ejection port 143, and thereby liquid discharged through the liquid ejection path 123 out from the liquid ejection port 124 is atomized as in a normal air spray.

FIG. 3 (*a*) is a partial plan view (A-arrow view) of the spraying pattern adjustment member 150. As illustrated in this figure, the spraying pattern adjustment member 150 is a disk-shaped member formed with the communication hole 141 and four communication grooves 151. The communication hole 141 is a circular through-hole having the same diameter as the gas ejection path 142. The four communication grooves 151 have the same opening shape as four pattern adjustment grooves 152 formed in the inner bottom surface of the bottom portion 122*c* of the nozzle body member. The communication grooves 151 are elongated through-holes arranged to extend radially from the communication hole 141. More specifically, the communication grooves 151 are grooves of four through-holes extending in the 12 o'clock direction, the 3 o'clock direction, the 6 o'clock direction, and the 9 o'clock direction, respectively, outward from the communication hole 141 provided at the center. The communication groove 151 may have any shape as long as it can serve as a communication flow path via which the pattern adjustment groove 152 and the third gas flow path 133 are in communication, and does not need to communicate with the communication hole 141.

The spraying pattern adjustment member 150 includes a switching operation member 154 for adjusting the position of the communication grooves 151 from outside the device (see FIG. 1, not illustrated in FIG. 3 (*a*)). In the present embodiment, an arrangement is adopted in which an oval through-hole is provided in a side surface of the nozzle body member 122, and the switching operation member 154, which is inserted through the through-hole, is coupled to the spraying pattern adjustment member 150. However, any arrangement can be adopted as long as the position of the communication grooves 151 is adjustable, and it is not limited to the illustrated embodiment. By rotating the spraying pattern adjustment member 150 with the switching operation member 154 and moving the position of the communication grooves 151 from the position of the pattern adjustment grooves 152, the spraying pattern can be changed. A part of a bottom surface of the spraying pattern adjustment member 150 where the communication grooves 151 are not formed (flat part between the communication grooves 151) constitutes a blocking portion 153 that blocks up the pattern adjustment grooves 152 when the position of the communication grooves 151 is moved from the position of the pattern adjustment grooves 152. Although the present embodiment discloses the switching operation member 154 that is manually operated, a position adjustment driving device such as an actuator may be connected to the switching operation member 154 so that the position of the spraying pattern adjustment member 150 can be automatically switched. As this position adjustment driving device, an electric motor, an air cylinder, a piezoelectric element, an electromagnet, or the like can be used. Enabling the automatic switching of the position of the spraying pattern adjustment member 150 allows the spraying pattern to be easily changed in the middle of spraying work.

FIG. 3 (*b*) is a partial plan view (A-arrow view) illustrating the inner bottom surface of the bottom portion **122*c* of the nozzle body member. As illustrated in this figure, the gas ejection path 142 and the four pattern adjustment grooves 152 are formed in the inner bottom surface of the bottom portion 122*c*** of the nozzle body member.

The pattern adjustment grooves 152 are arranged to extend radially from the gas ejection path 142 in the inner bottom surface of the bottom portion **122*c* of the nozzle body member. More specifically, the pattern adjustment grooves 152 are four grooves extending in the 12 o'clock direction, the 3 o'clock direction, the 6 o'clock direction, and the 9 o'clock direction, respectively, outward from the gas ejection path 142 provided at the center. A longitudinal central line 155 of each pattern adjustment groove 152 is positioned with an offset in a radial direction outward from the center of the circle of the gas ejection path 142. In other words, the pattern adjustment grooves 152 are arranged point-symmetrically about the center of the circle of the gas ejection path 142, but are not line-symmetrical about a straight line passing the center of the circle of the gas ejection path 142. In the present embodiment, each pattern adjustment groove 152 extends near and along a tangent line of the circle of the gas ejection path 142. Arranging the pattern adjustment grooves 152 such that they are respectively offset from two orthogonal straight lines passing through the center of the gas ejection path 142 (or communication hole 141) allows for producing a swirling flow. Details of the technical meaning of the arrangement where the pattern adjustment groove 152 is offset from a straight line that is substantially parallel to the pattern adjustment groove 152 and passes through the center of the communication hole 141 will be described later with reference to FIG. 14** (*c*) and (*d*).

An end of the pattern adjustment groove 152 communicates with the gas ejection path 142. As can be seen from FIG. 3 (*a*) and (*b*), the shape of an opening formed by the communication hole 141 and the four communication grooves 151 included in the spraying pattern adjustment member 150 is the same as the shape of an opening formed by the gas ejection path 142 and the four pattern adjustment grooves 152 formed in the inner bottom surface of the bottom portion **122*c*** of the nozzle body member.

In the present embodiment, the number of the pattern adjustment grooves 152 is four but is not limited thereto. For example, the number may be two, may be three or less, and may be five or more. Further, a plurality of the pattern adjustment grooves 152 are preferably arranged at equal intervals from each other around the gas ejection path 142. The number and the opening shape of the communication grooves 151 are the same as those of the pattern adjustment grooves 152.

The shape of the pattern adjustment groove 152 can be changed as appropriate depending on the physical properties of liquid, a desired spraying pattern, or the like. In the present embodiment, for example, the width of the pattern adjustment groove 152 is smaller than the radius of the gas ejection path 142, the length is almost the same as the width of the groove, and the depth is about half the width of the groove.

(Adjustment of Spraying Pattern)

Depending on the above-mentioned positional relationship between the spraying pattern adjustment member 150 and the pattern adjustment grooves 152 of the nozzle body member, the atomization device 10 can switch between a first position in which the communication grooves 151 and the pattern adjustment grooves 152 overlap (FIG. 4 (*a*)) and a second position in which the blocking portion 153 and the pattern adjustment grooves 152 overlap (FIG. 4 (*b*)). Switching between the first position and the second position is performed by rotating the spraying pattern adjustment member 150 around the central axis 14 of the atomization device 10. In the present embodiment, since there are four pattern adjustment grooves 152, by rotating the spraying pattern adjustment member 150 forty-five degrees to switch between the first position and the second position, the spraying pattern can be switched. In a case where there are a different number of the pattern adjustment grooves 152 from the present embodiment, the rotation angle of the spraying pattern adjustment member 150 required for switching of the spraying pattern is different. As described later, switching between the first position and the second position can cause a change in flow states of gas in the gas ejection path 142 and gas ejected from the gas ejection port 143, resulting in a change of a spray state accordingly.

Differences in actions made by switching the position of the spraying pattern adjustment member 150 will be described. Note that the switching operation member 154 is not illustrated in FIG. 5. Further, the difference in thickness of arrows in FIG. 5 represents the magnitude of a relative flow speed of the fluid.

(1) First Position (State of Pattern Adjustment Groove 152 Overlapping with Communication Groove 151)

A fluid flow accelerates in a narrower area. Within the gas that is going to flow into the gas ejection path 142, gas that has flown into the communication groove 151 accelerates because the communication groove 151 is narrower than the third gas flow path 133.

As illustrated in FIG. 5 (*a*), when the spraying pattern adjustment member 150 is positioned at the first position in which the communication grooves 151 and the pattern adjustment grooves 152 overlap, gas that has flown into the communication grooves 151 accelerates and the acceleration is further facilitated due to the pattern adjustment grooves 152. This makes a flow 162 from the communication groove 151 and the pattern adjustment groove 152 into the gas ejection path 142 (flow in a tangent direction of the outer edge of the gas ejection path 142) faster than flows 161 from positions with no communication groove 151 (positions of the blocking portions 153) into the gas ejection path 142 (flow toward the center of the gas ejection path 142). That is, a speed component that swirls, around the central axis 14, gas flowing into the gas ejection path 142 becomes stronger, which causes the gas to flow through the gas ejection path 142 and the gas ejection port 143 in a swirling flow. As illustrated in FIG. 6 (*a*), when the swirling flow is produced in the gas ejection path 142, liquid 163 that has been atomized into mist is ejected to spread as going toward an ejection direction and an application area of a spraying pattern 164 becomes larger.

(2) Second Position (State of Pattern Adjustment Groove 152 Overlapping with Blocking Portion 153)

Also in the second position, gas that has flown into the communication groove 151 accelerates because the communication groove 151 is narrower than the third gas flow path 133. However, as illustrated in FIG. 5 (*b*), the pattern adjustment grooves 152 are blocked up by the blocking portion 153 with the second position, and thus it is not the case that the acceleration of the gas that has flown into the communication grooves 151 is facilitated due to the pattern adjustment grooves 152 as in the case of the first position. For this reason, when the spraying pattern adjustment member 150 is positioned at the second position, the difference in speed between a flow 165 from the blocking portion 153 into the gas ejection path 142 (flow toward the center of the gas ejection path 142) and a flow 166 from the communication groove 151 into the gas ejection path 142 (flow in a tangent direction of the outer edge of the gas ejection path 142) does not become large. That is, a speed component that makes gas flowing into the gas ejection path 142 flow straight along the central axis 14 becomes dominant, which causes the gas to flow through the gas ejection path 142 and the gas ejection port 143 in a straight flow. As illustrated in FIG. 6 (*b*), when the flow in the gas ejection path 142 becomes straight, liquid 167 that has been atomized into mist is ejected almost straight toward the ejection direction and the application area of a spraying pattern 168 becomes smaller.

As an example, an experiment by the applicant confirmed that, in a case where the width of the spraying pattern was 10 mm with the second position, switching to the first position resulted in the increased width of the spraying pattern of 30 mm.

(3) Position Setting Stepwise from First Position to Second Position

The position of the spraying pattern adjustment member 150 can be set not only to the first position and the second position but also stepwise to positions between the first position and the second position. For example, the position of the spraying pattern adjustment member 150 may be set by rotating it in 3-, 5-, or 10-degree increments. With this configuration, the width of the spraying pattern can be changed continuously rather than discretely. In order to make this operation easier, a scale may be provided to allow for visualizing a rotation angle of the switching operation member 154. Further, the rotation angle of the switching operation member 154 can be automatically set by a driving device such as an actuator.

(Spraying Device 101)

A spraying device 101 that uses the above-mentioned atomization device 10 to atomize liquid into mist and spray it onto a target object will be described.

As illustrated in FIG. 7, the spraying device 101 according to the first embodiment includes the atomization device 10, a liquid supply source 102 that supplies the atomization device 10 with liquid to be sprayed, and a gas supply source 103 that supplies the atomization device 10 with gas for atomizing the liquid and supplies the liquid supply source 102 with the gas for feeding the liquid.

The atomization device 10 is connected to the liquid supply source 102 by a liquid tube 104 and is connected to the gas supply source 103 by a first gas tube 105. The first gas tube 105 has a first pressure regulator 107*a* that regulates a pressure of the gas, and a first on-off valve 108*a* that is provided on the downstream side of the first pressure regulator 107*a* and opens and closes the first gas tube 105.

The liquid supply source 102 is connected to the gas supply source 103 by a second gas tube 106. The second gas tube 106 has a second pressure regulator 107*b* that regulates a pressure of the gas, and a second on-off valve 108*b* that is located on the downstream side of the second pressure regulator 107*b* and opens and closes the second gas tube 106.

A control device 109 controls operation of the first and second pressure regulators (107*a*, 107*b*) and the first and second on-off valves (108*a*, 108*b*).

Although the liquid is fed to the atomization device 10 by pressure of compressed gas in the example of FIG. 7, the liquid may be supplied to the atomization device 10 by a pump provided in the middle of the liquid tube 104 instead of the compressed gas. In this case, the control device 109 controls operation of the pump. The atomization device 10 may be mounted on a relative movement device that allows for moving it relative to a target object, or may be equipped with a grip to be held in a hand. Further, in a case where the position adjustment driving device that automatically adjusts the position of the spraying pattern adjustment member 150 is provided, an operation means is provided for the automatic position adjustment and the control device 109 controls the position adjustment driving device in response to input signals from the operation means.

The spraying device 101 of the first embodiment constituted as above operates as follows. Assume that the spraying pattern adjustment member 150 is at the first position.

To start spraying, the control device 109 "opens" the first on-off valve 108*a* provided in the first gas tube 105 via which the gas supply source 103 and the atomization device 10 are in communication and "opens" the second on-off valve 108*b* provided in the second gas tube 106 via which the gas supply source 103 and the liquid supply source 102 are in communication. Then, liquid is supplied to the atomization device 10 and gas for atomizing the liquid is supplied to the atomization device 10. The liquid discharged from the liquid ejection port 124 is mixed with the gas flowing around it and atomized into mist (reference symbol 163) to be sprayed onto a target object. To finish spraying, the control device 109 "closes" the on-off valve 108*a* in the first gas tube 105 connecting the gas supply source 103 to the atomization device 10 and "closes" the on-off valve 108*b* in the second gas tube 106 connecting the gas supply source 103 to the liquid supply source 102. Then, supply of the liquid and the gas stops and spraying also stops. For changing the spraying pattern, the position of the spraying pattern adjustment member 150 is changed to the second position.

As described above, the spraying device 101 of the first embodiment allows the spraying pattern to be changed without replacing parts. In addition, since an ejecting pattern of gas can be adjusted by just turning the spraying pattern adjustment member 150, the equipment structure is simple. Also, since a plurality of gas supply paths are not needed for switching a spraying pattern, the structure of the gas supply path can be simplified.

Furthermore, gas is ejected from the same ejection port even when the spraying pattern is switched and not a flow amount but an ejection direction alone changes. Therefore, the spraying pattern can be changed with a smaller influence of a speed change of a gas flow when liquid is atomized into mist.

Second Embodiment (Atomization Device 20)

An atomization device 20 according to a second embodiment is different from the atomization device 10 according to the first embodiment in that a rod 21 that opens and closes the liquid ejection path 123 and a rod driving device 22 are provided and that the nozzle body member consists of an upper nozzle body member 222 and a lower nozzle body member 223. Hereinafter, different points will be mainly described while the same components as those in the first embodiment are denoted with the same reference symbols and descriptions thereof are omitted.

As illustrated in FIG. 8, the atomization device 20 of the second embodiment also includes one liquid supply flow path and one gas supply flow path as in the first embodiment. In the second embodiment, the rod 21 with a narrower diameter than the second liquid flow path 112 is arranged in the second liquid flow path 112. The rod 21 is provided along the central axis 14 and is coupled to the rod driving device 22 arranged on the upper side of the acceptance member 11. The rod driving device 22 moves the rod 21 forward and backward in the vertical direction in the second liquid flow path 112. As the rod driving device 22, for example, a device driven by compressed air, a device driven by an electric motor, or a device driven by an electromagnet can be used.

A rod lower end portion 21*a* is located in the depressed portion 121*b* of the liquid nozzle member. The rod 21 is moved forward or backward in the vertical direction and the rod lower end portion 21*a* comes in contact with or separates from an inner bottom surface 121*d* of the liquid nozzle member, thereby putting the second liquid flow path 112 and the liquid ejection path 123 in communication or isolation. That is, the rod 21 and the rod driving device 22 act as an on-off valve of the liquid ejection path 123 or the second liquid flow path 112. Although FIG. 8 illustrates the rod lower end portion 21*a* constituted by a flat surface, the shape thereof is only required to be able to close the entrance of the liquid ejection path 123 and the rod lower end portion 21*a* may be constituted by a curved surface or an inclined surface. Further, although the inner bottom surface 121*d* of the liquid nozzle member is also illustrated as a flat surface, it may be constituted by a curved surface or an inclined surface corresponding to the shape of the rod lower end portion 21*a* as long as the rod lower end portion 21*a* can block the entrance of the liquid ejection path 123.

In the atomization device 20 of the second embodiment, a lower end portion of the upper nozzle body member 222 is open and a spraying pattern adjustment member 250 and the lower nozzle body member 223 are detachably attached to close the opening. In other words, in the atomization device 20 of the second embodiment, the nozzle body member consists of the upper nozzle body member 222 and the lower nozzle body member 223, and the lower nozzle body member 223 is formed with a gas ejection path 242 and pattern adjustment grooves 252.

As illustrated in FIG. 9 (*a*), the spraying pattern adjustment member 250 is provided with a communication hole 241, communication grooves 251, and a blocking portion 253. Actions of the communication hole 241, the communication grooves (communication flow paths) 251, and the blocking portion 253 are the same as those in the first embodiment. In addition, the spraying pattern adjustment member 250 is provided with a protruded edge portion 250*a* (see FIG. 8, not illustrated in FIG. 9 (*a*)) and a pair of arc-shaped switching holes 250*b*.

The protruded edge portion 250*a* is an annular segment formed to extend vertically at the outer edge of the spraying pattern adjustment member 250. Since the spraying pattern adjustment member 250 of the second embodiment has the protruded edge portion 250*a*, it is "H"-shaped in sectional view as illustrated in FIG. 8.

The inner diameter of the upper side of the protruded edge portion 250*a* is sized such that the lower end portion of the upper nozzle body member 222 fits inside it. Further, the inner diameter of the lower side of the protruded edge portion 250*a* is the same as the outer diameter of the lower nozzle member 223. That is, the lower nozzle body member 223 is sized to fit inside the lower side of the protruded edge portion 250*a*. The protruded edge portion 250*a* also functions as a switching operation member in switching operation. That is, rotating operation of the protruded edge portion 250*a* allows for setting the spraying pattern adjustment member 250 to the first position or the second position, or stepwise to positions between the first position and the second position, so that the spraying pattern can be switched. A scale may be provided to allow for visualizing a rotation angle of the protruded edge portion 250*a* and anti-slip treatment may be applied to an outer side surface.

The pair of switching holes 250*b* are arc-shaped holes through which a pair of supporting members 261 are inserted (see FIG. 8). The switching hole 250*b* is shaped to secure a required rotation angle of the spraying pattern adjustment member 250 (that is, arc of a certain length). For example, in a case where four communication grooves 251 and pattern adjustment grooves 252 that are the same as those in the first embodiment are provided, the shape of the switching hole 250*b* is an arc of a length allowing for forty-five-degree rotation. Also in the second embodiment including the four communication grooves 251 and pattern adjustment grooves 252, by rotating the spraying pattern adjustment member 250 forty-five degrees to switch between the first position and the second position, the spraying pattern can be switched.

As illustrated in FIG. 9 (*b*), the lower nozzle body member 223 is a disk-shaped member provided with the gas ejection path 242 penetrating the center and the four pattern adjustment grooves 252 in an upper surface. As can be seen from FIG. 9 (*a*) and (*b*), the shape of an opening formed by the communication hole 241 and the four communication grooves 251 included in the spraying pattern adjustment member 250 is the same as the shape of an opening formed by the gas ejection path 242 and the four pattern adjustment grooves 252 formed in the upper surface of the lower nozzle body member 223.

In the present embodiment, the shape of the gas ejection path 242 is circular in plan view, but it may be oval.

Also in the second embodiment, the number of the pattern adjustment grooves 252 is not limited to four, and may be two, may be three or less, and may be five or more. Further, as in the first embodiment, the width, length, and depth of the pattern adjustment groove 252 can be changed as appropriate depending on the physical properties of the liquid, a desired spraying pattern, or the like.

There may be prepared several types of combinations of a lower nozzle body member 223 including pattern adjustment grooves 252 of a different shape, and a spraying pattern adjustment member 250 including communication grooves 251 of a corresponding shape. Then, the lower nozzle body member 223 and the spraying pattern adjustment member 250 may be replaced with ones that are selected for use according to desired spraying conditions. For example, it is disclosed that there are prepared: a first lower nozzle body member including two pattern adjustment grooves and a first spraying pattern adjustment member including communication grooves of a corresponding shape; a second lower nozzle body member including three pattern adjustment grooves and a second spraying pattern adjustment member including communication grooves of a corresponding shape; and a third lower nozzle body member including four pattern adjustment grooves and a third spraying pattern adjustment member including communication grooves of a corresponding shape, and one combination is selected and utilized according to desired spraying conditions.

The lower nozzle body member 223 is provided with a pair of supporting holes 223*a* through which the pair of supporting members 261 are inserted. The lower nozzle body member 223 is fixed at the lower end portion of the upper nozzle body member 222 by the supporting members 261 with the spraying pattern adjustment member 250 in between. The supporting member 261 can be a bolt, for example, but is not limited thereto. Something like a clamp may be adopted for fixation. Note that the shape of the supporting hole 223*a* of the lower nozzle body member 223 may be arcuate like the switching hole 250*b*, and conversely the shape of the switching hole 250*b* may be circular like the supporting hole 223*a*, which allows for switching the spraying pattern by rotating the lower nozzle body member 223. In this configuration, the lower nozzle body member 223 functions as a switching operation member.

(Spraying Device 201)

A spraying device 201 according to the second embodiment is different from the spraying device 101 according to the first embodiment in that a control device 209 controls the rod driving device 22. Hereinafter, different points will be mainly described while the same components as those in the first embodiment are denoted with the same reference symbols and descriptions thereof are omitted.

As illustrated in FIG. 10, in the spraying device 201 of the second embodiment, the rod driving device 22 included in the atomization device 20 is connected to the control device 209. The other components are the same as those of the spraying device 101 of the first embodiment.

The atomization device 20 of the second embodiment performs spraying operation as follows. Assume that the spraying pattern adjustment member 250 is at the first position.

First, the control device 209 controls the rod driving device 22 to bring the rod lower end portion 21*a* into contact with the inner bottom surface 121*d* of the liquid nozzle member, "opens" the on-off valve 108*a* in the first gas tube 105 connecting the gas supply source 103 to the atomization device 20, and "opens" the on-off valve 108*b* in the second gas tube 106 connecting the gas supply source 103 to the liquid supply source 102. Then, the atomization device 20 is supplied with liquid and gas for atomizing the liquid.

Next, the rod driving device 22 is controlled such that the rod lower end portion 21*a* separates from the inner bottom surface 121*d* of the liquid nozzle member and the liquid ejection path 123 communicates with the second liquid flow path 112. Then, the liquid is discharged from the liquid ejection port 124, mixed with the gas flowing around it, and atomized into mist (reference symbol 163) to be sprayed onto a target object.

To finish spraying, first, the control device 209 controls the rod driving device 22 to bring the rod lower end portion 21*a* into contact with the inner bottom surface 121*d* of the liquid nozzle member and shut the liquid ejection path 123, "closes" the on-off valve 108*a* in the first gas tube 105 connecting the gas supply source 103 to the atomization device 20, and "closes" the on-off valve 108*b* in the second gas tube 106 connecting the gas supply source 103 to the liquid supply source 102. Then, supply of the liquid and the gas to the atomization device 20 stops and spraying also stops. For changing the spraying pattern, the position of the spraying pattern adjustment member 250 is changed to the second position. Also in the spraying device 201 of the second embodiment, as in the first embodiment, the spraying pattern adjustment member 250 may be connected to a position adjustment driving device to enable automatic switching. In a case where the position adjustment driving device is provided, the control device 209 controls the position adjustment driving device.

As described above, the spraying device 201 of the second embodiment also achieves the same functional effects as those of the first embodiment.

Further, in the second embodiment, since the rod 21 opens and closes the entrance of the liquid ejection path 123, liquid is cut off well when spraying stops and extra dripping of the liquid can be prevented. Such a configuration is particularly effective when liquid has low viscosity.

In addition, since the spraying pattern adjustment member 250 provided with the communication grooves 251 is detachably attached, preparing several spraying pattern adjustment members 250 provided with communication grooves 251 of different shapes allows for carrying out more various spraying patterns.

Third Embodiment (Atomization Device 30)

An atomization device 30 according to a third embodiment is different from the atomization device 10 according to the first embodiment and the atomization device 20 according to the second embodiment mainly in that the nozzle body member consists of an upper nozzle body member 922 and a lower nozzle body member 923 which can be turned and that two gas ejection paths (942*a*, 942*b*) are provided.

Hereinafter, different points will be mainly described while the same components as those in the first embodiment or the second embodiment are denoted with the same reference symbols and descriptions thereof are omitted.

As illustrated in FIG. 15, the atomization device 30 of the third embodiment includes one liquid supply flow path, one gas supply flow path, and the two gas ejection paths (942*a*, 942*b*). In the atomization device 30 of the third embodiment, as in the atomization device 20 of the second embodiment, the lower end of the upper nozzle body member 922 is open and a spraying pattern adjustment member 950 is detachably attached and fixed to close this opening. Further, the lower nozzle body member 923 is attached to cover the spraying pattern adjustment member 950 and the lower end of the upper nozzle body member 922 such that the lower nozzle body member 923 can be turned around the central axis 14.

As illustrated in FIG. 15, the spraying pattern adjustment member 950 is a disk-shaped member with a protruded cross-section and includes a trunk portion 950*a*, a flange portion 950*b*, and a gas ejection portion 950*c*. The trunk portion 950*a* has an outer diameter that is sized to just fit the inner diameter of the upper nozzle body member 922, and is fitted and fixed into the opening portion of the lower end of the upper nozzle body member 922. The flange portion 950*b* extending outward is provided at the lower end of the trunk portion 950*a*. The outer diameter of the annular flange portion 950*b* is almost the same as the outer diameter of the lower end portion of the upper nozzle body member 922. An upper surface of the flange portion 950*b* is in contact with the lower end portion of the upper nozzle body member 922 and defines the position of the spraying pattern adjustment member 950. The flange portion 950*b* of the spraying pattern adjustment member 950 is designed to be fixed to the upper nozzle body member 922 by a fixing member not illustrated. The cylindrical gas ejection portion 950*c* extends downward from the center of a lower surface 950*d* of the spraying pattern adjustment member 950.

At the center of the spraying pattern adjustment member 950, there is provided a second gas ejection path 942*b* that is a through-hole provided from an upper surface of the trunk portion 950*a* to a lower surface of the gas ejection portion 950*c*. The second gas ejection path 942*b* always communicates with the third gas flow path 133, and the liquid ejection portion 121*c* of the liquid nozzle member 121 is inserted therethrough. The inner diameter of the second gas ejection path 942*b* is larger than the outer diameter of the liquid ejection portion 121*c*, which allows gas to be ejected from a gap between an outer peripheral surface of the needle-like liquid ejection portion 121*c* and an inner peripheral surface of the columnar second gas ejection path 942*b*. The second gas ejection path 942*b* is not closed by a blocking portion 953 and thus, when the atomization device 30 is in operation, gas filling the third gas flow path 133 is ejected from the second gas ejection path 942*b* through a second gas ejection port 943*b* to the outside. The second gas ejection path 942*b* is a gas ejection path for atomization that does not produce a swirling flow.

As illustrated in FIG. 16 (*a*), the spraying pattern adjustment member 950 is provided with four through-holes (communication flow paths) 951 that cut out part of the outer edge of the trunk portion 950*a* and penetrate the flange portion 950*b* from the upper surface to the lower surface. The through-holes 951 are columnar through-holes of which centers are arranged at equal intervals on a circle of the outer edge of the trunk portion 950*a*, and function as communication flow paths via which the third gas flow path 133 and pattern adjustment grooves 952 of the lower nozzle body member 923 are in communication. In the third embodiment, the example where there are four through-holes 951 is illustrated, but the number thereof may be three or less and may be five or more. The area of the lower surface of the trunk portion 950*a* of the spraying pattern adjustment member where the through-holes 951 are not provided constitutes the blocking portion 953 (see FIG. 17 (*b*)). In other words, the area between the through-holes 951 on the circle of the outer edge of the trunk portion 950*a* constitutes the blocking portion 953. In the present embodiment, the shape of the through-hole 951 is circular in plan view, but it may be oval.

As illustrated in FIG. 15, the lower nozzle body member 923 is a member with a depressed cross-section and functions as a cap member that covers and closes the opening of the lower end of the upper nozzle body member 922 to which the spraying pattern adjustment member 950 is attached. The lower nozzle body member 923, which has an inner diameter that is sized to slide on an outer side surface of the upper nozzle body member 922, is attached to the lower end of the upper nozzle body member 922 and, in that state, supported by a pair of supporting members 961 inserted through a pair of attachment holes 923*b* that are through-holes provided in a side surface. In the illustrated example, an upper end surface 923*a* of the lower nozzle body member 923 is a horizontal flat surface, but it may be an inclined surface or a curved surface. A side surface of the upper nozzle body member 922, at locations facing the attachment holes 923*b*, is formed with a pair of turning grooves 922*b* in which the supporting members 961 are fitted. The turning groove 922*b* is formed horizontally along the side surface of the upper nozzle body member 922 at such a length that the lower nozzle body member 923 can be turned around the central axis 14 by a required angle. In the third embodiment, there are two turning grooves 922*b*, but the number thereof may be three or more.

At the center of the lower nozzle body member 923, a first gas ejection path 942*a* is provided that is a through-hole provided from an upper surface to a lower surface thereof. The gas ejection portion 950*c* having the second gas ejection path 942*b* is inserted through the first gas ejection path 942*a*. The first gas ejection path 942*a* is concentric with the liquid ejection portion 121*c* inserted through the cylindrical gas ejection portion 950*c* and with the gas ejection portion 950*c*. The inner diameter of the first gas ejection path 942*a* is larger than the outer diameter of the gas ejection portion 950*c*, which allows, in the case of the first position in which communication with the third gas flow path 133 is secured, gas to be ejected from a gap between an outer peripheral surface of the gas ejection portion 950*c* and an inner peripheral surface of the first gas ejection path 942*a*. The first gas ejection path 942*a* is a gas ejection path for switching the spraying pattern that produces a swirling flow. That is, the spraying pattern can be switched by switching between the first position in which gas filling the third gas flow path 133 is ejected from the first gas ejection path 942*a* through the first gas ejection port 943*a* to the outside and the second position in which the first gas ejection path 942*a* is closed by the blocking portion 953 and no gas is ejected from the first gas ejection port 943*a* to the outside. Although, in the example of FIG. 15, a tip of the gas ejection portion 950*c* protrudes below a bottom surface of the lower nozzle body member 923, the tip of the gas ejection portion 950*c* may be on the same plane as the bottom surface of the lower nozzle body member 923.

As illustrated in FIG. 16 (*b*), on an inner bottom surface of the lower nozzle body member 923, the four pattern adjustment grooves 952 communicating with the first gas ejection path 942*a* are provided. The pattern adjustment grooves 952 are elongated through-holes arranged to extend radially from the first gas ejection path 942*a*, and are the same as those of the first and second embodiments in that longitudinal central lines 955 thereof are arranged to be respectively offset from two orthogonal straight lines passing through the center of the first gas ejection path 942*a*. In the third embodiment, the example where there are four pattern adjustment grooves 952 is illustrated, but the number thereof may be three or less and may be five or more. In addition, a plurality of the pattern adjustment grooves 952 are preferably arranged at equal intervals from each other as in the first and second embodiments. Since the gas ejection portion 950*c* of the spraying pattern adjustment member 950 having the second gas ejection path 942*b* is inserted through the first gas ejection path 942*a*, the diameter of the first gas ejection path 942*a* is larger than those of the gas ejection paths 142, 242 of the first and second embodiments.

(Adjustment of Spraying Pattern)

In the first position illustrated in FIG. 17 (*a*), the through-holes 951 of the spraying pattern adjustment member 950 and the pattern adjustment grooves 952 of the lower nozzle body member 923 overlap. More specifically, in the first position, the through-holes 951 of the spraying pattern adjustment member 950 are positioned such that they overlap, on the side closer to the center, closed end portions of the pattern adjustment grooves 952 of the lower nozzle body member 923. Thus, in the first position, the third gas flow path 133 and the first gas ejection path 942*a* are in communication via the through-holes 951 and the pattern adjustment grooves 952.

In the second position illustrated in FIG. 17 (*b*), the pattern adjustment grooves 952 of the lower nozzle body member 923 is covered by the blocking portion 953 of the spraying pattern adjustment member 950. Thus, in the second position, communication between the third gas flow path 133 and the first gas ejection path 942*a* is interrupted by the blocking portion 953.

Switching between the first position and the second position is performed by rotating the lower nozzle body member 923 around the central axis 14 of the atomization device 30. That is, in the third embodiment, the lower nozzle body member 923 functions as a switching operation member. Also in the third embodiment, since there are four pattern adjustment grooves 952 arranged at equal intervals, rotating the lower nozzle body member 923 forty-five degrees to switch the position can switch the spraying pattern.

Differences in actions made by switching between the first position and the second position by turning the lower nozzle body member 923 will be described.

(1) First position (State of Through-hole 951 Overlapping with Pattern Adjustment Groove 952)

Gas that has flown into the second gas ejection path 942*b*, which always communicates with the third gas flow path 133, flows straight between an outer wall of the liquid ejection portion 121*c* and an inner wall of the second gas ejection path 942*b* and atomizes liquid ejected from the liquid ejection port 124. Meanwhile, as illustrated in FIG. 17 (*a*), when the lower nozzle body member 923 is at the first position in which the through-holes 951 and the pattern adjustment grooves 952 overlap, gas that has flown into the through-holes 951 flows into the pattern adjustment grooves 952 from the closed end portion side of the pattern adjustment grooves 952. The gas that has flown into the pattern adjustment grooves 952 is ejected through the first gas ejection path 942*a* out of the first gas ejection port 943*a* as a swirling flow. Therefore, liquid atomized near the liquid ejection port 124 is ejected to spread as going along an ejection direction due to this swirling flow. This results in a larger application area than in the second position.

(2) Second Position (State of Blocking Portion 953 Overlapping with Pattern Adjustment Groove 952)

Gas that has flown into the second gas ejection path 942*b*, which always communicates with the third gas flow path 133, flows straight between the outer wall of the liquid ejection portion 121*c* and the inner wall of the second gas ejection path 942*b* and atomizes liquid ejected from the liquid ejection port 124. Meanwhile, as illustrated in FIG. 17 (*b*), when the lower nozzle body member 923 is at the second position in which the blocking portion 953 and the pattern adjustment grooves 952 overlap, no gas flows into the pattern adjustment grooves 952 from the third gas flow path 133 and thus no gas is ejected through the first gas ejection path 942*a* out of the first gas ejection port 943*a*. Therefore, liquid atomized near the liquid ejection port 124 is not affected by a swirling flow from the first gas ejection port 943*a* and thus ejected straight toward the ejection direction. This results in a smaller application area than in the first position.

Also in the third embodiment, an overlapping degree between the through-hole 951 and the pattern adjustment groove 952 can be adjusted stepwise from the first position to the second position by a rotation angle of the lower nozzle body member 923.

Further, also in the third embodiment, as in the second embodiment, the rod 21 that opens and closes the liquid ejection path 123 and the rod driving device 22 can be provided.

(Spraying Device)

A spraying device according to the third embodiment has the same configuration as the spraying device 101 according to the first embodiment illustrated in FIG. 7 except that the atomization device 10 is replaced with the atomization device 30. In a case where the rod 21 that opens and closes the liquid ejection path 123 and the rod driving device 22 are provided, the configuration is the same as that of the spraying device 201 according to the second embodiment illustrated in FIG. 10 except that the atomization device 20 is replaced with the atomization device 30.

As described above, the spraying device of the third embodiment also achieves the same advantageous effects as the spraying devices of the first and second embodiments.

In addition, in the third embodiment, a gas ejection path is divided into the first gas ejection path 942*a* for producing a swirling flow and the second gas ejection path 942*b* for a straight flow, which allows for making a clearer difference between a spreading spraying pattern and a narrowing spraying pattern.

Although the preferred embodiments of the present invention have been described above, the technical scope of the present invention is not limited to the descriptions of the above embodiments. Various alterations and modifications can be applied without departing from the technical idea of the present invention, and such altered or modified modes also fall within the technical scope of the present invention. The variations exemplified below are also within the technical idea of the present invention.

For example, in the first embodiment, the position of the lower end of the liquid ejection portion 121*c* of the liquid nozzle member may be adjustable. FIG. 11 (*a*) is a partial sectional view of a nozzle lower end portion of the atomization device 10 in a case where the liquid ejection portion 121*c* of the liquid nozzle member is at a first retracted position. In the first retracted position, the liquid ejection port 124 and the gas ejection port 143 are positioned on the same plane.

FIG. 11 (*b*) is a partial sectional view of the nozzle lower end portion of the atomization device 10 in a case where the liquid ejection portion 121*c* of the liquid nozzle member is at a second retracted position. In the second retracted position, the lower end of the liquid ejection portion 121*c* is positioned within the gas ejection path 142.

In the atomization device 10 of the first embodiment, a nozzle position adjustment mechanism (not illustrated) may be provided at a connection part between the liquid flow path member 113 and the liquid nozzle member 121 so that the position of the lower end of the liquid ejection portion 121*c* of the liquid nozzle member can be dynamically changed from the position of FIG. 2 (protruded position) to the position of FIG. 11 (*a*) (first retracted position) or the position of FIG. 11 (*b*) (second retracted position). For example, it is disclosed that: when first liquid with relative low viscosity is sprayed, the position of FIG. 2 (protruded position) is taken where the lower end of the liquid ejection portion 121*c* of the liquid nozzle member is positioned outside the gas ejection path 142; when second liquid with higher viscosity than the first liquid is sprayed, the lower end of the liquid ejection portion 121*c* of the liquid nozzle member is at the position of FIG. 11 (*a*) (first retracted position); and when third liquid with higher viscosity than the second liquid is sprayed, the lower end of the liquid ejection portion 121*c* of the liquid nozzle member is at the position of FIG. 11 (*b*) (second retracted position). Also in the second and third embodiments, the position of the lower end of the liquid ejection portion 121*c* of the liquid nozzle member can be adjustable as illustrated in FIG. 11.

An atomization device illustrated in FIG. 12 has a gas ejection path (342, 442, 542) of which inner peripheral surface is constituted by a tapered surface in part or in whole.

In FIG. 12 (*a*), the gas ejection path 342 has inclination to narrow toward a gas ejection port 343. That is, the gas ejection path 342 illustrated in FIG. 12 (*a*) is constituted by a truncated-cone-shaped space.

In FIG. 12 (*b*), the gas ejection path (442*a*, 442*b*) is constituted by a truncated-cone-shaped first gas ejection path 442*a* narrowing toward a gas ejection port 443, and a columnar second gas ejection path 442*b*.

In FIG. 12 (*c*), the gas ejection path (542*a*, 542*b*) is constituted by a columnar first gas ejection path 542*a* and a truncated-cone-shaped second gas ejection path 542*b* narrowing toward a gas ejection port 543.

As in the variations illustrated in FIG. 12, by providing an inclined surface as a narrowing part to a gas ejection path, the flow speed of gas ejected from the gas ejection port can be made faster than those in the first embodiment and the second embodiment. Note that the gas ejection paths of the variations illustrated in FIG. 12 are applicable to any of the first to third embodiments.

In FIG. 13 (*a*), a pattern adjustment groove 352 includes an inclined surface to descend toward the gas ejection path (142, 242). With the configuration of FIG. 13 (*a*), the speed of the swirling flow can be made faster than those in the first embodiment and the second embodiment.

In FIG. 13 (*b*), a pattern adjustment groove 452 includes an inclined surface to rise toward the gas ejection path (142, 242). With the configuration of FIG. 13 (*b*), the speed of the swirling flow can be made slower than those in the first embodiment and the second embodiment.

Note that the pattern adjustment grooves of the variations illustrated in FIG. 13 are applicable not only to the first and second embodiments but also to the first gas ejection path 942*a* and the lower nozzle body member 923 of the third embodiment.

In FIG. 14 (*a*), a pattern adjustment groove (552*a*, 552*b*) is constituted by a first pattern adjustment groove 552*a* extending outward in a straight line from the gas ejection path (142, 242) and a second pattern adjustment groove 552*b* extending in a direction intersecting the first pattern adjustment groove 552*a*. The configuration of FIG. 14 (*a*) allows for producing a stronger swirling flow than in the first embodiment and the second embodiment due to having the second pattern adjustment groove 552*b* that is obliquely continuous with the first pattern adjustment groove 552*a*.

In FIG. 14 (*b*), a pattern adjustment groove 652 has an overall curved shape (in other words, arc) rather than a straight line. The configuration of FIG. 14 (*b*) allows for producing a stronger swirling flow than in the first embodiment and the second embodiment due to having the curved pattern adjustment groove 652.

In FIG. 14 (*c*), a pattern adjustment groove 752 is connected to the gas ejection path (142, 242) at a closer position to the straight line that passes through the center of the gas ejection path (142, 242) and extends in the horizontal direction than in the first embodiment and the second embodiment. That is, the distance L1 of the longitudinal central line of the pattern adjustment groove 752 from the straight line that passes through the center of the gas ejection path (142, 242) and extends in the horizontal direction is shorter than in the first embodiment and the second embodiment.

In FIG. 14 (*d*), a pattern adjustment groove 852 is connected to the gas ejection path (142, 242) at a farther position from the straight line that passes through the center of the gas ejection path (142, 242) and extends in the horizontal direction than in the first embodiment and the second embodiment. That is, the distance L2 of the longitudinal central line of the pattern adjustment groove 852 from the straight line that passes through the center of the gas ejection path (142, 242) and extends in the horizontal direction is longer than in the first embodiment and the second embodiment.

As in the variations illustrated in FIG. 14 (*c*) and FIG. 14 (*d*), the strength of the swirling flow can be adjusted also by changing the connection position between the pattern adjustment groove and the gas ejection path.

The pattern adjustment grooves of the variations illustrated in FIG. 14 are applicable not only to the first and second embodiments but also to the first gas ejection path 942*a* and the lower nozzle body member 923 of the third embodiment.

In any of the first to third embodiments and the variations of FIGS. 12 to 14, the depth, width, and length of the pattern adjustment grooves can be adjusted as appropriate. Further, the variations illustrated in FIGS. 12 to 14 are applicable in any combination as appropriate.

LIST OF REFERENCE SYMBOLS

10: atomization device/11: acceptance member/12: atomization nozzle/13: coupling member/14: central axis/20: atomization device/21: rod/22: rod driving device/30: atomization device/101, 201: spraying device/102: liquid supply source/103: gas supply source/104: liquid tube/105: first gas tube/106: second gas tube/107: pressure regulator/108: on-off valve/109, 209: control device/110: liquid supply port/111: first liquid flow path/112: second liquid flow path/113: liquid flow path member/121: liquid nozzle member/122: nozzle body member/123: liquid ejection path/124: liquid ejection port/130: gas supply port/131: first gas flow path/132: second gas flow path/133: third gas flow path/141, 241: communication hole (central communication hole)/ 142, 242, 342, 442, 542: gas ejection path/143, 343, 443, 543: gas ejection port/150, 250, 950: spraying pattern adjustment member/151, 251: communication groove (communication flow path)/152, 252, 352, 452, 552, 652, 752, 852, 952: pattern adjustment groove/ 153, 253, 953: blocking portion/154: switching operation member/155, 955: central line of pattern adjustment groove/161: flow from position of blocking portion into gas ejection path (first position)/162: flow from pattern adjustment groove into gas ejection path (first position)/163: liquid that has been atomized into mist (first position)/164: spraying pattern (first position)/165: flow from blocking portion into gas ejection path (second position)/166: flow from communication groove into gas ejection path (second position)/167: liquid that has been atomized into mist (second position)/168: spraying pattern (second position)/222, 922: upper nozzle body member/223, 923: lower nozzle body member/942*a*: first gas ejection path/942*b*: second gas ejection path/943*a*: first gas ejection port/943*b*: second gas ejection port/951: through-hole (communication flow path)/961: supporting member

The invention claimed is:

1. An atomization nozzle that sprays, by gas supplied from a gas supply flow path, liquid supplied from a liquid supply flow path, the atomization nozzle comprising;

a nozzle body member having a gas ejection path and a gas ejection port for ejecting the gas supplied from the gas supply flow path;

a liquid nozzle member having a liquid ejection path and a liquid ejection port for ejecting the liquid supplied from the liquid supply flow path, a tip portion of the liquid nozzle member being inserted through the gas ejection path;

a pattern adjustment groove that extends outward from the gas ejection path and produces a swirling flow in the gas ejection path; and a spraying pattern adjustment member having a communication flow path via which the pattern adjustment groove and the gas supply flow path are in communication, and a blocking portion that covers the pattern adjustment groove, wherein a spraying pattern can be changed by switching between a first position in which the pattern adjustment groove and the gas supply flow path are in communication via the communication flow path and a second position in which the pattern adjustment groove is covered by the blocking portion.

2. The atomization nozzle according to claim 1, wherein the atomization nozzle has a plurality of the pattern adjustment grooves and a plurality of the communication flow paths.

3. The atomization nozzle according to claim 2, wherein the pattern adjustment grooves include three or more pattern adjustment grooves that are evenly arranged with respect to each other.

4. The atomization nozzle according to claim 1, wherein the nozzle body member includes a trunk portion having an internal space serving as a gas flow path via which the gas supply flow path and the gas ejection path are in communication, and a bottom portion in which the gas ejection path and the pattern adjustment groove are formed.

5. The atomization nozzle according to claim 4, wherein the spraying pattern adjustment member includes a switching operation member for switching between the first position and the second position.

6. The atomization nozzle according to claim 4, wherein the nozzle body member includes the bottom portion having an inner bottom surface in which the pattern adjustment groove is formed, and the spraying pattern adjustment member is arranged on the inner bottom surface of the bottom portion of the nozzle body member.

7. The atomization nozzle according to claim 1, wherein the nozzle body member includes an upper nozzle body member and a lower nozzle body member, wherein the upper nozzle body member includes an internal space serving as a gas flow path via which the gas supply flow path and the gas ejection path are in communication and has a lower end portion with an opening, and the pattern adjustment groove is formed in the lower nozzle body member, and wherein the atomization nozzle further comprises a supporting member that supports the spraying pattern adjustment member between the lower end portion of the upper nozzle body member and the lower nozzle body member.

8. The atomization nozzle according to claim 7, wherein switching between the first position and the second position is performed by rotating the spraying pattern adjustment member.

9. The atomization nozzle according to claim 7, wherein the lower nozzle body member includes a first lower nozzle body member formed with the pattern adjustment groove having a first opening shape and a second lower nozzle body member formed with the pattern adjustment groove having a second opening shape, and wherein one out of the first lower nozzle body member and the second lower nozzle body member can be selected to support the spraying pattern adjustment member with the supporting member.

10. The atomization nozzle according to claim 7, wherein the gas ejection path includes a first gas ejection path that is provided in the lower nozzle body member and communicates with the pattern adjustment groove, and a second gas ejection path that is provided in the spraying pattern adjustment member, the liquid nozzle member being inserted through the second gas ejection path, and wherein switching between the first position and the second position is performed by rotating the lower nozzle body member.

11. The atomization nozzle according to claim 1, wherein an opening shape of the pattern adjustment groove and an opening shape of the communication flow path are the same.

12. The atomization nozzle according to claim 1, wherein the pattern adjustment groove is provided at a position offset from a straight line that passes through a center of the gas ejection path and extends in a horizontal direction.

13. The atomization nozzle according to claim 1, wherein overlap between the communication flow path and the pattern adjustment groove is adjustable stepwise by setting a position stepwise from the first position to the second position.

14. The atomization nozzle according to claim 1, comprising a position adjustment driving device that automatically performs switching between the first position and the second position.

15. An atomization device comprising:

the atomization nozzle according to claim 1; and an acceptance member that has the liquid supply flow path and the gas supply flow path and is coupled to the atomization nozzle.

16. The atomization device according to claim 15, comprising an on-off valve for putting the liquid supply flow path and the liquid ejection path in communication and isolation.

17. The atomization device according to claim 16, wherein the on-off valve includes a rod that opens and closes a flow path entrance in the liquid nozzle member and a rod driving device that moves the rod forward and backward.

18. A spraying device comprising:

the atomization device according to claim 15;

a gas supply source that supplies the atomization device with gas;

a liquid supply source that supplies the atomization device with liquid to be sprayed;

a pressure regulating device that regulates pressure of the gas supplied by the gas supply source to send the gas to the atomization device;

a liquid feeding device that applies pressure to the liquid supplied by the liquid supply source to send the liquid to the atomization device; and a control device that controls operation of the pressure regulating device and the liquid feeding device.

19. The spraying device according to claim 18, wherein the liquid feeding device includes:

(A) a pressure regulator and an on-off valve that are provided in a pipe via which the gas supply source and the liquid supply source are in communication; or (B) a pump that is provided in a pipe via which the atomization device and the liquid supply source are in communication.

20. A spraying method using the spraying device according to claim 18, comprising the steps of:

performing application in a state where the pattern adjustment groove and the gas supply flow path are in communication; and performing application in a state where the pattern adjustment groove is covered by the blocking portion.

* * * * *